(12) United States Patent
Okada et al.

(10) Patent No.: US 6,266,086 B1
(45) Date of Patent: Jul. 24, 2001

(54) IMAGING APPARATUS

(75) Inventors: Hideo Okada, Uda-gun; Tetsuo Iwaki, Yamatokoriyama; Tohru Okuda, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/895,244

(22) Filed: Jul. 16, 1997

(30) Foreign Application Priority Data

Aug. 7, 1996 (JP) .................................................. 8-208613

(51) Int. Cl.$^7$ ............................ H04N 5/225; H04N 5/228
(52) U.S. Cl. ............................................. 348/218; 348/208
(58) Field of Search .................................. 348/208, 218, 348/219, 335, 207

(56) References Cited

U.S. PATENT DOCUMENTS

| | | | |
|---|---|---|---|
| 5,192,964 | * 3/1993 | Shinohara et al. | 354/202 |
| 5,237,405 | * 8/1993 | Egusa et al. | 348/218 |
| 5,379,063 | * 1/1995 | Kishi et al. | 348/208 |
| 5,867,213 | * 2/1999 | Ouchi | 348/208 |
| 5,907,353 | * 5/1999 | Okaudie | 348/218 |

FOREIGN PATENT DOCUMENTS

| | | | |
|---|---|---|---|
| 60-054576A | 3/1985 | (JP) | H04N/5/335 |
| 63-284980A | 11/1988 | (JP) | H04N/5/335 |
| 974524 | 3/1997 | (JP) | H04N/5/335 |

\* cited by examiner

*Primary Examiner*—Wendy R. Garber
*Assistant Examiner*—Luong Nguyen

(57) ABSTRACT

An imaging apparatus includes a solid-state imaging element having a matrix of pixels thereon, an optical series for entering a subject image into the solid-state imaging element, and an image shifting mechanism for relatively shifting the subject image in 2-D with respect to the solid-state imaging element. A control circuit is further included for controlling an operation of the image shifting mechanism. Still further, an image synthesizing circuit is included for synthesizing a plurality of images shifted by the image shifting mechanism, along with a moving amount detecting unit for detecting a moving amount of the subject image on the solid-state imaging element. Finally, the imaging apparatus includes a shift amount generating unit for generating an image shift amount for the subject image first, and thence a correction image shift amount based on the image shift amount and moving amount, based on which the image shifting mechanism shifts the subject image. The above arrangement makes it possible to correct a movement of the subject image formed by the imaging apparatus, thereby realizing a high-resolution image.

4 Claims, 16 Drawing Sheets

PRIOR ART

IMAGING APPARATUS

FIELD OF THE INVENTION

The present invention relates to an imaging apparatus using a solid-state imaging element, and more particularly, to an imaging apparatus furnished with an image shifting mechanism for obtaining a high-resolution image.

BACKGROUND OF THE INVENTION

Conventionally, a solid-state imaging element, such as a CCD (Charge Coupled Device), has been extensively used as a camera element of an image pick up apparatus. The resolution of the solid-state imaging element is generally determined by the number of pixels formed on the photo-receiving surface of the solid-state imaging element. Thus, when a high resolution is desired, only the number of the pixels on the solid-state imaging element has to be increased. However, the conventional techniques can increase the number of the pixels only to the extent that the cost and size permit.

To solve the above problem, Japanese Laid-open Patent Application Nos. 54576/1985 and 284980/1988 (Tokukaisho Nos. 60-54576 and 63-284980, respectively), for example, disclose an imaging apparatus adopting an image shifting mechanism. According to these references, an image with a relatively high resolution can be obtained using a solid-state imaging element having a limited number of pixels thereon.

More specifically, as shown in FIG. 16 illustrating the feature of the first reference, a tilting angle θ of a plane parallel glass plate 101 is changed, so that incident light on the solid-state imaging element from a subject is shifted by a very small distance Δ when an image is stored into an image memory. For further understanding, a relation between the tilting angle θ of the plane parallel glass plate 101 and a shift amount Δ is expressed as:

$$\Delta = t \cdot \sin\theta(1 - 1/n)$$

where t is a thickness and n is a refractive index of the plane parallel glass plate 101.

On the other hand, as shown in FIG. 17 illustrating the feature of the second reference, light from a subject 200 goes into a photo-receiving surface of a solid-state imaging element 203 through an optical series 201 and a plane parallel glass plate 202a when an image is stored into an image memory of an image forming section 204. Here, the plane parallel glass plate 202a is fixed to a driving unit 202b, so that the driving unit 202b tilts the plane parallel glass plate 202a at a certain degree angle with respect to the optical axis.

In the prior art, a plurality of images stored in the image memory in the above manner are synthesized, thereby obtaining a resolution as high as the resolution obtained when the number of the pixels on the solid-state imaging element is increased.

Next, the operation for synthesizing shifted images A and B on the image memory will be explained with reference to FIGS. 17 through 20. Since the image synthesizing operations are basically the same, the following description is based on the second reference for convenience.

To begin with, a first image A is stored in the image memory of the image forming section 204, and the alignment of the image data at this point is illustrated in FIG. 18(a). Note that a capital letter A in the drawing indicates each piece of the image data of the image A and numerical subscripts indicate serial column and row numbers assigned to each piece of the image data. For example, $A_{12}$ indicates that it is a piece of the image data of the image A aligned at the first column and second row.

Then, the plane parallel glass plate 202a is tilted 45° with respect to the pixel array on the solid-state imaging element 203 both in the horizontal and vertical directions, so that a second image B is obtained by shifting a subject image formed on the solid-state imaging element 203. The image B thus obtained is also stored in the image memory of the image forming section 204, and the alignment of the image data at this point is illustrated in FIG. 18(b). Note that a capital letter B in the drawing indicates each piece of the image data of the image B and numerical subscripts indicate serial column and row numbers assigned to each piece of the image data. For example, $B_{12}$ indicates that it is a piece of the image data of the image B aligned at the first column and second row.

Here, the alignment of the image data of the image A with those of the image B is illustrated in FIG. 19. In the drawing, a broken line indicates the image data of the first image data A, while a solid line indicates the image data of the second image data B. The image data of the image B are shifted with respect to the image data of image A by half the pixel pitches Px and Py in X-axis and Y-axis directions of the solid-state imaging element 203, respectively. Here, the X-axis and Y-axis of the solid-state imaging element 203 refer to the horizontal and vertical directions, respectively.

As shown in FIG. 20, the image forming section 204 synthesizes the image data of the two images A and B. In the drawing, positions with a symbol ○ are empty in the beginning, and new image data, for example, an average value of nearby pixels, are provided therein through interpolation later. The resolution of the synthesized image thus obtained is approximately twice as good as the original resolution of the solid-state imaging element 203.

As has been explained, to obtain a high-resolution image by an imaging apparatus furnished with the image shifting mechanism, at least two images must be inputted at different times to effect the image shifting. Note that, however, the images A and B are shifted from each other by a time-related factor besides the above image shifting. The cause of this kind of shifting is assumed to be an unstable vibration conveyed to the imaging apparatus when the imaging apparatus is supported by hands (hereinafter, referred to as hand holding), or the displacement of the subject 200. Since the latter problem is not unique to the imaging apparatus furnished with the image shifting mechanism but common to all types of imaging apparatus, no further discussion is given herein.

Thus, in case that the imaging apparatus, such as a still camera and a movie camera, is not firmly supported on a tripod but supported unstably by hands, the images A and B are shifted from each other by the hand holding in addition to the image shifting, thereby making it impossible to obtain a high-resolution image even when the image shifting is effected. If this kind of unwanted shifting is significant, the resolution of the synthesized image can be hardly improved, and in a worse case, the resolution may be deteriorated.

SUMMARY OF THE INVENTION

It is therefore an object of the present invention to provide an imaging apparatus which can prevent the deterioration of the resolution caused by the hand holding.

To fulfill the above object, an imaging apparatus of the present invention is characterized by being furnished with:
 a solid-state imaging element having thereon a matrix of
  pixels;

an optical series for entering a subject image into the solid-state imaging element;

an image shifting mechanism for shifting the subject image in 2-D relatively with respect to the solid-state imaging apparatus;

a control circuit for controlling an operation of the image shifting mechanism;

an image synthesizing circuit for synthesizing a plurality of images shifted by the image shifting mechanism;

a moving amount detecting unit for detecting a moving amount of the subject image on the solid-state imaging element; and a shift amount generating unit for generating an image shift amount of the subject image first, and thence a first correction image shift amount based on the image shift amount and moving amount, based on which the image shifting mechanism shifts the subject image.

According to the above arrangement, the subject image which is incident on the solid-state imaging element through the optical series is shifted in 2-D relatively with respect to the solid-state imaging element by the image shifting mechanism before it is formed thereon. Then, a plurality of images shifted in the above manner are synthesized by the image synthesizing circuit. Here, the image shift amount of the subject image is generated by the shift amount generating unit, and the operation of the image shifting mechanism is controlled by the control circuit.

The shift amount generating unit also generates the first correction image shift amount based on the image shift amount and moving amount, and the image shifting mechanism shifts the subject image based on the first correction image shift amount thus generated. Therefore, even if the subject image moves while the imaging apparatus is supported by hands, for example, the image shifting is effected by taking such a moving amount into consideration. Consequently, even if the subject image moves while the imaging apparatus is supported by hands, a high-resolution image can be obtained without being affect such a movement.

To fulfill the above object, another imaging apparatus of the present invention is characterized by being furnished with:

a solid-state imaging element having thereon a matrix of pixels;

an optical series for entering a subject image into the solid-state imaging element;

an image shifting mechanism for shifting the subject image by a certain shift amount in 2-D relatively with respect to the solid-state imaging element;

a control circuit for controlling an operation of the image shifting mechanism;

a moving amount detecting unit for detecting a moving amount of the subject image on the solid-state imaging element;

an operation judging circuit for judging whether image shifting should be effected or not based on a comparison of the moving amount with a predetermined value, the operation judging circuit judging the image shifting should be effected when the moving amount is equal to or smaller than the predetermined value; and an image synthesizing circuit for, when the operation judging circuit judges that the image shifting should not be effected, for applying interpolation to an image formed on the solid-state imaging element, and when the operation judging circuit judges that the image shifting should be effected, the image synthesizing circuit synthesizing a plurality of images shifted by the image shifting mechanism through image processing.

According to the above arrangement, the operation judging circuit makes a judgment based on the largeness of the moving amount detected by the moving amount detecting unit. When the operation judging circuit judges that the moving amount is greater than the predetermined value, the image shifting is not effected. Instead, the image synthesizing circuit applies the interpolation to the subject image formed on the solid-state imaging element through the optical series to form a high-resolution image.

On the other hand, when the operation judging circuit judges that the moving amount is equal to or smaller than the predetermined value, the image shifting is effected. In other words, the subject image incident on the solid-state imaging element through the optical series is shifted by a predetermined shift amount in 2-D with respect to the solid-state imaging element by the image shifting mechanism before it is formed thereon. Then, a plurality of subject images formed in the above manner are synthesized through the image processing by the image synthesizing circuit. Here, the operation of the image shifting mechanism is controlled by the control circuit.

In short, according to the above arrangement, the image synthesizing circuit operates in different manners depending on the moving amount. Consequently, it has become possible to optimize an optimal image processing method based on the detected moving amount. Therefore, a high-resolution image can be obtained without being affected by the moving amount.

To fulfill the above object, a further imaging apparatus of the present invention is characterized by being furnished with:

a solid-state imaging element having thereon a matrix of pixels;

a varifocal optical series for entering a subject image into the solid-state imaging element;

an image shifting mechanism for shifting the subject image by a certain shift amount in 2-D relatively with respect to the solid-state imaging element;

a control circuit for controlling an operation of the image shifting mechanism;

a focal length detecting unit for detecting a focal length of the optical series;

an operation judging circuit for judging whether image shifting should be effected or not based on a comparison of the focal length with a predetermined value, the operation judging circuit judging that the image shifting should be effected when the focal length is equal to or smaller than the predetermined value; and an image synthesizing circuit for, when the operation judging circuit judges that the image shifting should not be effected, for applying interpolation to an image formed on the solid-state imaging element, and when the operation judging circuit judges that the image shifting should be effected, the image synthesizing circuit synthesizing a plurality of images shifted by the image shifting mechanism through image processing.

According to the above arrangement, the operation judging circuit makes a judgment based on the focal length detected by the focal length detecting unit. When the operation judging circuit judges that the focal length is greater than the predetermined value, the image shifting is not effected. Instead, the image synthesizing circuit applies the interpolation to the subject image formed on the solid-state imaging element through the optical series to form a high-resolution image.

On the other hand, when the operation judging circuit judges that the focal length is equal to or smaller than the predetermined value, the image shifting is effected. In other words, the subject image incident on the solid-state imaging element through the optical series is shifted by a predetermined shift amount in 2-D with respect to the solid-state imaging element by the image shifting mechanism before it is formed thereon. Then, a plurality of subject images formed in the above manner are synthesized through the image processing by the image synthesizing circuit. Here, the operation of the image shifting mechanism is controlled by the control circuit.

In short, according to the above arrangement, the image synthesizing circuit operates in different manners depending on the focal length. Consequently, it has become possible to optimize an optimal image processing method based on the detected focal length. Therefore, a high-resolution image can be obtained without being affected by the focal length.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) is a view explaining the alignment of the image data before correction;

FIG. 6(b) is a view explaining the alignment of the image data after correction;

FIG. 7 is a view explaining a state after two kinds of image data are synthesized;

FIG. 18(a) is a view illustrating image data of an image A;

FIG. 18(b) is a view illustrating image data of an image B;

Figure 20:
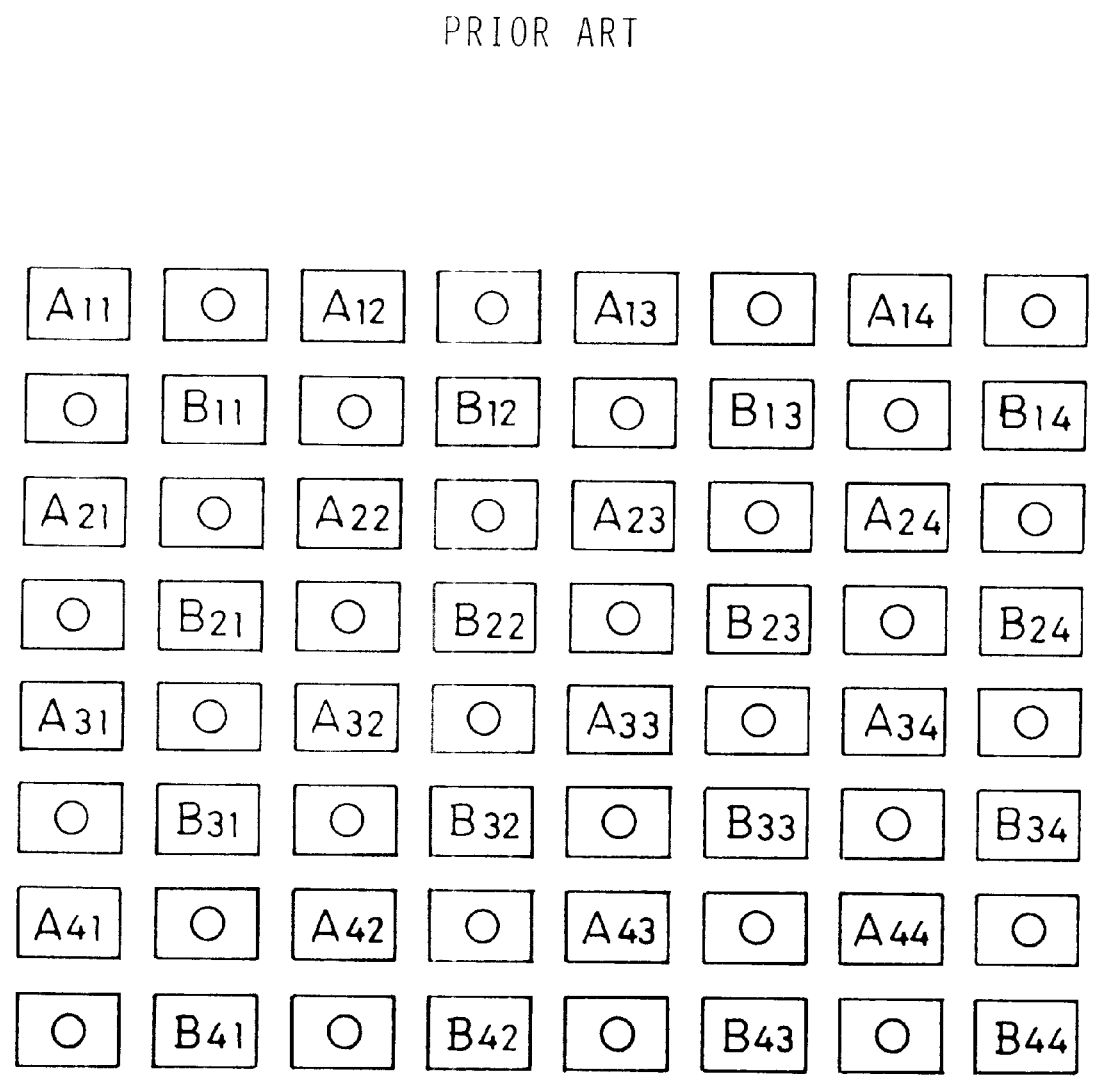

FIG. 20 is a view explaining a state after the above two kinds of image data are synthesized.

DESCRIPTION OF THE EMBODIMENTS

Embodiment 1

The following description will describe an example embodiment of the present invention with reference to the accompanying drawings.

Figure 1:
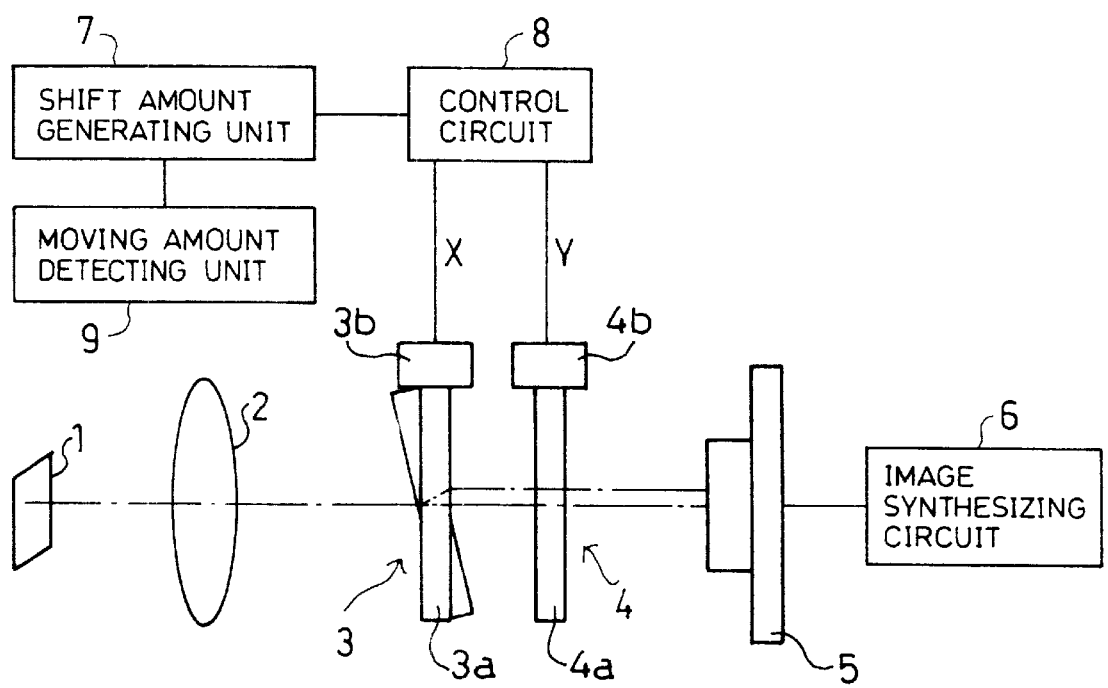
FIG. 1 is a view explaining an example embodiment of an imaging apparatus of the present invention.

As schematically shown in FIG. 1, an imaging apparatus in accordance with the present embodiment comprises an optical series 2, an X-axis image shifting mechanism 3 and a Y-axis image shifting mechanism 4 both serving as an image shifting mechanism, a solid-state imaging element 5, an image synthesizing circuit 6, a shift amount generating unit 7, a control circuit 8, and a moving amount detecting unit 9. In the drawing, an alternate long and short dashed line indicates the optical axis.

To make the explanation easy to understand, other components not particularly relevant to the present invention (for example, a driving circuit of the solid-state imaging element 5, an image processing unit for generating a video signal) are omitted in the drawing and the explanation of the same is also omitted herein. However, the omission is not intended to limit the scope of the present invention.

The optical series 2 includes a series of lenses for converging incident light from a subject 1 on the solid-state imaging element 5.

The X-axis image shifting mechanism 3 comprises a transparent plane parallel plate 3a and a driving unit 3b driving the plane parallel plate 3a. The plane parallel plate 3a is furnished with a function for shifting light coming from a subject image by a predetermined shift amount in a horizontal direction relatively with respect to the solid-state imaging element 5 when the light passes through the same. The driving unit 3b drives the plane parallel plate 3a to tilt at a certain degree angle in the horizontal direction with respect to the optical axis, so that the plane parallel plate 3a can shift the light from subject image in the above manner. A tilting amount of the plane parallel plate 3a is controlled by the control circuit 8.

The Y-axis image shifting mechanism 4 comprises a transparent plane parallel plate 4a and a driving unit 4b driving the plane parallel plate 4a. The plane parallel plate 4a is furnished with a function for shifting light coming from a subject image by a predetermined shift amount in a vertical direction relatively with respect to the solid-state imaging element 5 when the light passes through the same. The driving unit 4b drives the plane parallel plate 4a to tilt at a certain degree angle in the vertical direction with respect to the optical axis, so that the plane parallel plate 4a can shift the light from the subject image in the above manner. A tilting amount of the plane parallel plate 4a is controlled by the control circuit 8. In other words, the X-axis image shifting mechanism 3 and Y-axis image shifting mechanism 4 operate independently; the former is responsible for the image shifting in the horizontal direction of the solid-state imaging element 5, while the latter is responsible for the image shifting in the vertical direction of the solid-state imaging element 5. The arrangement of the X-axis image shifting mechanism 3 and Y-axis image shifting mechanism 4 is explained in detail in Japanese Laid-open Patent Application No. 51483/1997 (Tokukaihei No. 9-51483) filed by the inventors of the present invention, and the detailed explanation is omitted herein.

The solid-state imaging element 5 comprises a matrix of CCDs (Charge Coupled Devices). Thus, a plurality of pixels are aligned in 2-D on the photo-receiving surface of the solid-state imaging element 5. Consequently, an image of the subject 1 focused by the optical series 2 is formed on the solid-state imaging element 5 after the image is shifted in 2-D by a predetermined shift amount by means of the X-axis image shifting mechanism 3 and Y-axis image shifting mechanism 4.

The image synthesizing circuit 6 is furnished with a function for synthesizing a plurality of images shifted by the X-axis image shifting mechanism 3 and Y-axis image shifting mechanism 4 and formed on the solid-state imaging element 5.

The shift amount generating unit 7 generates an image shift amount (Xr, Yr) of the subject image, which is in effect a control target value of the control circuit 8. Here, Xr and Yr represent an image shift amount of the subject image in the horizontal and vertical directions, respectively. The control circuit 8 controls the X-axis image shifting mechanism 3 and Y-axis image shifting mechanism 4 in such a manner that the image of the subject 1 is shifted by the image shift amount (Xr, Yr).

Generally, a fixed value is given to the image shift amount (Xr, Yr), for example, Xr=½Px, Yr=½Py, where Px and Py indicate pixel pitches of the solid-state imaging element 5 in the X-axis direction (horizontal direction) and Y-axis direction (vertical direction), respectively.

The moving amount detecting unit 9 detects a moving amount of the subject image associated with a vibration conveyed to the imaging apparatus when the imaging apparatus is supported by hands, for example. After the moving amount detecting unit 9 detects the moving amount, the shift amount generating unit 7 computes a first corrected image shift amount (X, Y) based on the image shift amount (Xr, Yr) and the moving amount, and outputs the same to the control circuit 8.

Next, an operation of the imaging apparatus in accordance with the present embodiment will be explained in the following with reference to FIGS. 2(*a*) and 2(*b*).

Figure 2:
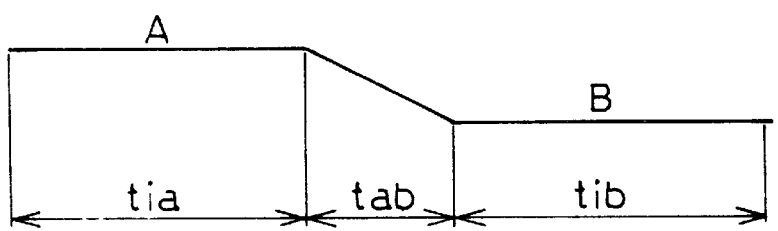
FIG. 2(a) is a timing chart indicating timing at which an image position shifts.
FIG. 2(b) is a timing chart indicating timing at which image data are stored into an image memory of an image synthesizing circuit from a solid-state imaging element.
Figure 2:
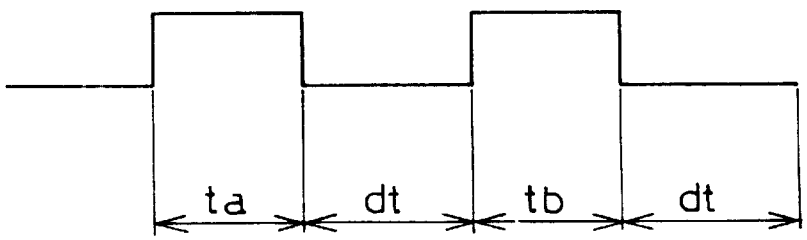

FIG. 2(*a*) illustrates a shifting position of a subject image by the image shifting, while FIG. 2(*b*) shows a timing at which an image is taken into the solid-state imaging element 5.

To begin with, the control circuit 8 drives the driving units 3*b* and 4*b* under control in response to an output value (for example, Xr=0, Yz=0) generated from the shift amount generating unit 7. Accordingly, the X-axis image shifting mechanism 3 and Y-axis image shifting mechanism 4 are driven to the positions where neither mechanism shifts the subject image on the solid-state imaging element 5. Under these conditions, the subject image having passed through the optical series 2, X-axis image shifting mechanism 3 and Y-axis image shifting mechanism 4 is formed on the solid-state imaging element 5 at a position A shown in FIG. 2(*a*) and is withheld for a period tia.

Figures 18A, 18B:
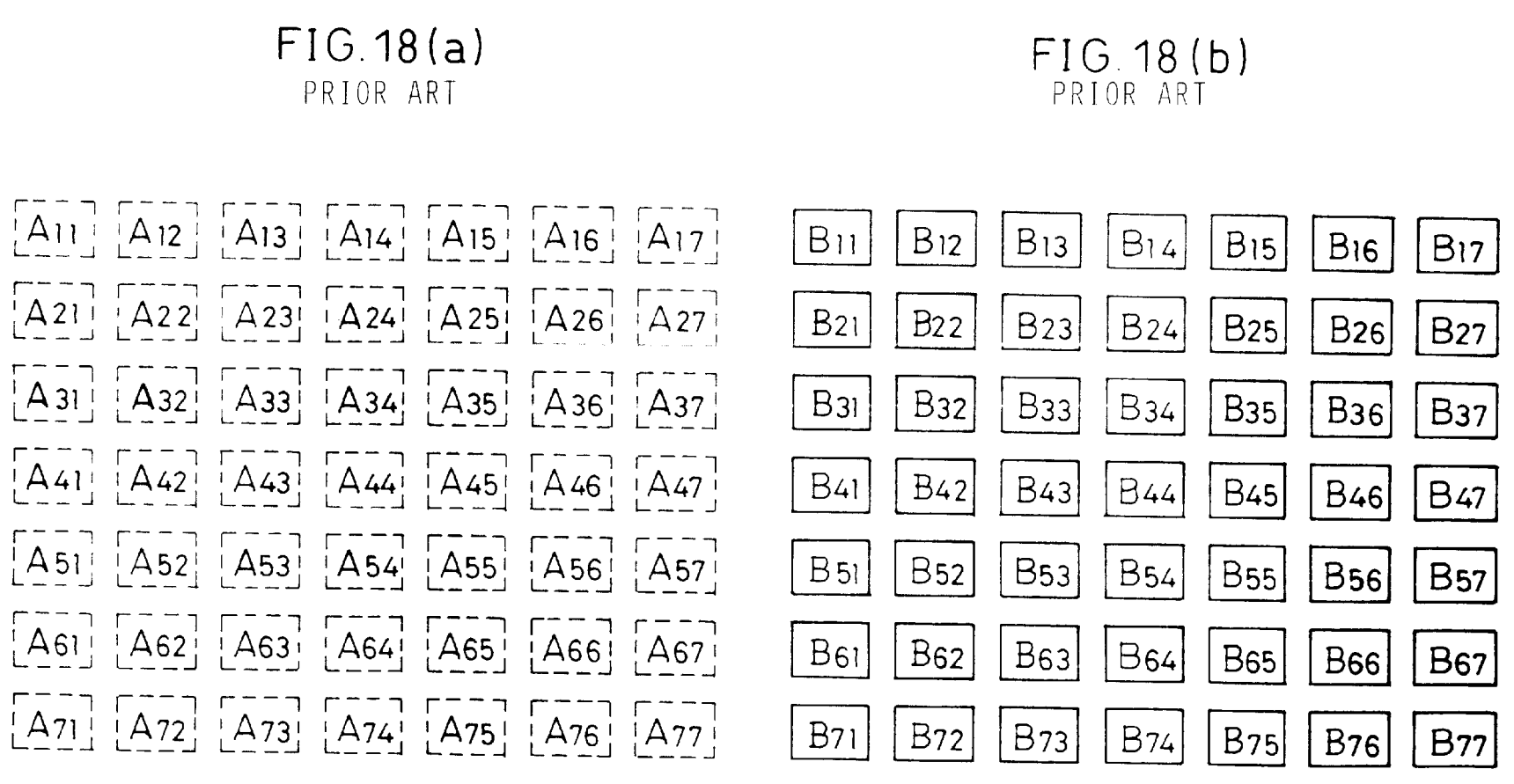

Then, the withheld subject image is accumulated in an unillustrated photoreceptor section on the solid-state imaging element 5 at the timing ta shown in FIG. 2(*b*). Subsequently, the image data of the subject image are stored into the image memory of the image synthesizing circuit 6 in a time dt. The first image data stored into the image memory in the above manner are referred to as image data A, and an example of which is illustrated in FIG. 18(*a*).

Then, the control circuit 8 drives the driving units 3*b* and 4*b* under control again in response to an output value generated from the shift amount generating unit 7 (for example, Xr=½Px, Yr=½Py), so that each of the X-axis image shifting mechanism 3 and Y-axis image shifting mechanism 4 tilts at a certain degree angle with respect to the optical axis. Under these conditions, the subject image is shifted and formed on the solid-state imaging element at a position B shown in FIG. 2(*a*) and is withheld for a period tib.

The shifted and withheld subject image is accumulated in the photoreceptor section on the solid-state imaging element 5 at a timing tb shown in FIG. 2(*b*). Subsequently, the image data of the subject image are stored into the image memory of the image synthesizing circuit 6 in the time dt. The image data stored into the image memory in the above manner are referred to as image data B, an example of which is illustrated in FIG. 18(*b*).

It is understood from the above description that there is a time difference dt between the formation of the first and second images on the photoreceptor section of the solid-state imaging element 5. Here, the time difference dt is finite because if a shifting time (transfer time) tab for moving the subject image from the position A to the position B is longer, dt is invariably limited by the moving time tab.

Figure 3:
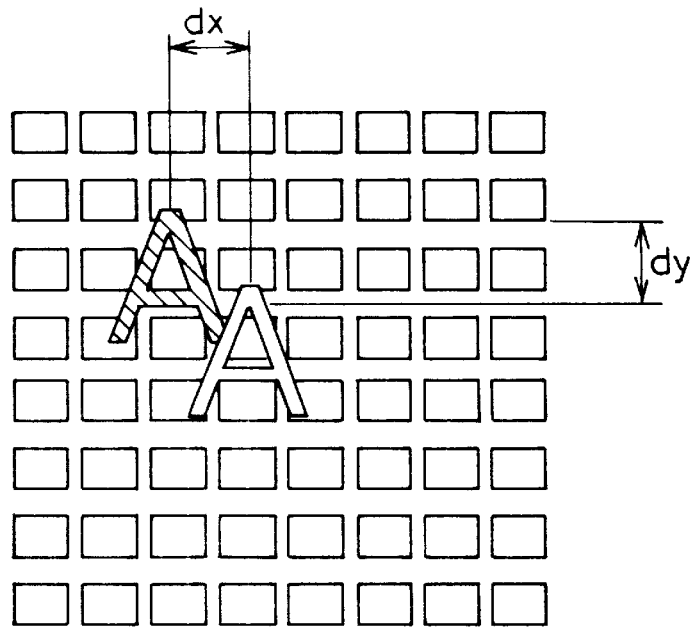
FIG. 3 is a view explaining the movement of an image on the solid-state imaging element.

Thus, if the imaging apparatus is shaken by hand holding, the formed image (herein, a capital letter A) is moved as well as shown in FIG. 3. In other words, as shown in the drawing, a hatched capital letter A is moved to a position indicated by an outlined capital letter A during a time difference dt. Here, dx is a moving amount in the X-axis direction (horizontal direction), and dy is a moving amount in the Y-axis direction (vertical direction).

Thus, the first correction image shift amount (X, Y) can be readily expressed as below with the initial image shift amount (Xr (for example, ½Px), Yr (for example, ½Py)) and the moving amount (dx, dy):

$X = Xr + dx$ $Y = Yr + dy.$

Here, the unit of the correction image shift amount (X, Y) is a pixel pitch in the horizontal and vertical directions of the solid-state imaging element 5, respectively.

Figure 4:
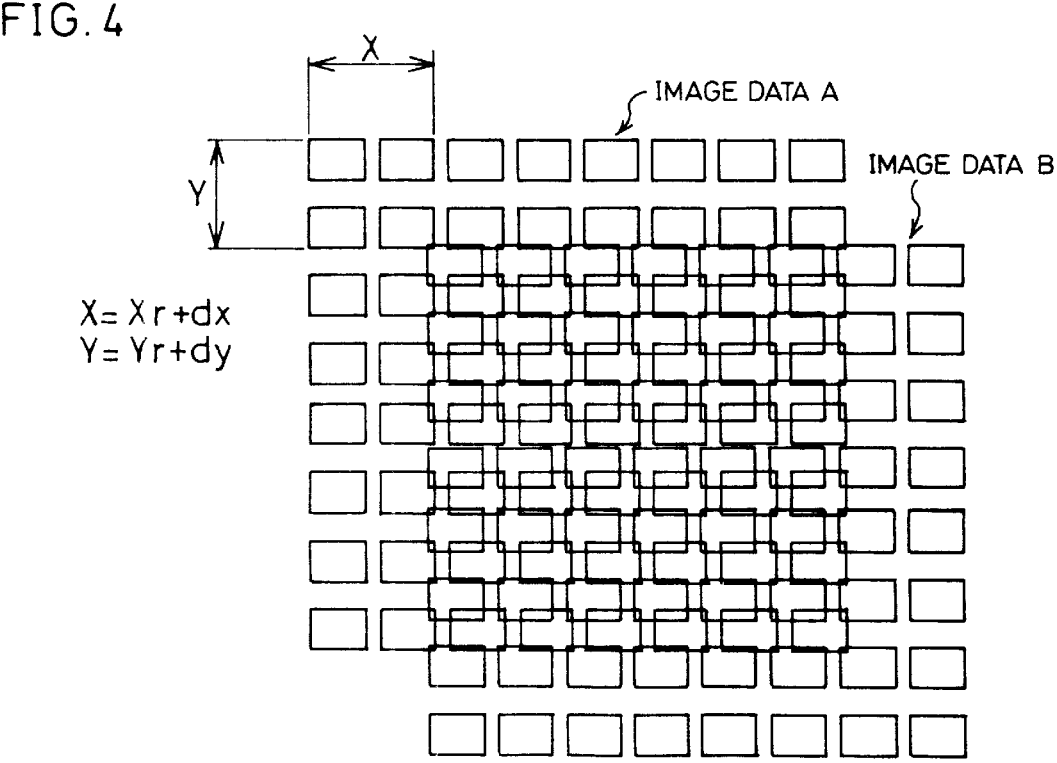
FIG. 4 is a view explaining the alignment of two kinds of image data on the solid-state imaging element when the imaging apparatus is moved.

Thus, when the moving amount detecting unit 9 detects the moving amount (dx, dy), the shift amount generating unit 7 carries out an operation based on the above equations and generates the first correction image shift amount (X, Y), which is outputted to the control circuit 8. Here, the alignment of the image data A and B of the two images taking the moving amount (dx, dy) into account is illustrated in FIG. 4. Accordingly, the image synthesizing circuit 6 synthesizes the image data A and B through the image shifting in a conventional manner.

As has been explained, in the imaging apparatus of the present embodiment, the shift amount generating unit 7 computes the first correction image shift amount based on the initial image shift amount (Xr, Yr) and the moving amount (dx, dy) of the subject image detected by the moving amount detecting unit 9, based on which the X-axis image shifting mechanism 3 and Y-axis image shifting mechanism 4 effect the image shifting to the subject image.

Consequently, if the subject image is moved when the imaging apparatus is supported by hands, for example, the image shifting is effected by taking such a moving amount into account. Therefore, even if the imaging apparatus of the present embodiment is moved while being supported by hands, a high-resolution image can be obtained without being affected such an unwanted movement.

Embodiment 2

The following description will describe another example embodiment of the present invention with reference to the accompanying drawings. Since an imaging apparatus of the present embodiment is identical with the counterpart in Embodiment 1 above in structure, the explanation of the same is omitted herein. Also, since the components other than the image synthesizing circuit 6 and shift amount generating unit 7 (see FIG. 1) operate in the same manner as their respective counterparts in Embodiment 1 above, the operation of the image synthesizing circuit 6 and shift amount generating unit 7 will be described mainly in the following.

Figure 5:
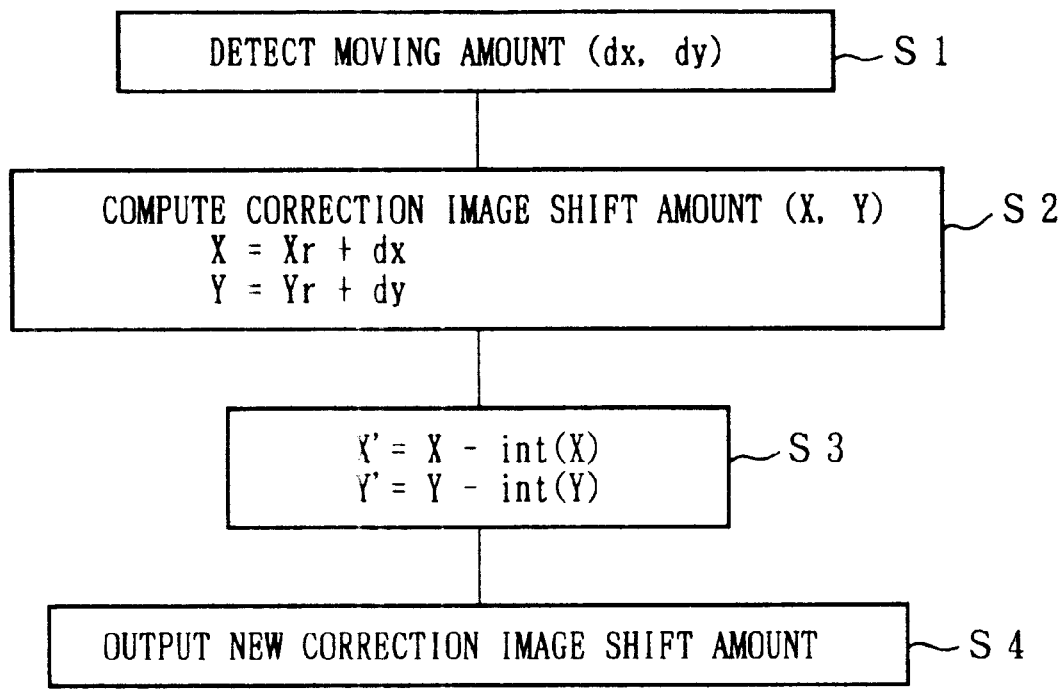
FIG. 5 is a flowchart detailing an operation of a shift amount generating unit.

FIG. 5 is a flowchart detailing an operation of the shift amount generating unit 7 of the present embodiment. It is helpful to also refer to FIG. 1 in the following explanation.

To begin with, when the moving amount unit 9 detects the moving amount (dx, dy) (S1: S represents Step), the shift amount generating unit 7 computes the first correction image shift amount (X, Y) based on the equations used in the Embodiment 1 above (S2).

Then, the shift amount generating unit 7 carries out an operation based on equations below to find a new correction image shift amount, namely a second correction image shift amount (X', Y') (S3):

$$X'=X-int(X)$$

$$Y'=Y-int(Y)$$

where int (a) is a greatest integer not larger than a.

Then, the shift amount generating unit 7 outputs the second correction image shift amount (X', Y') to the control circuit 8 (S4).

On the other hand, the image synthesizing circuit 6 corrects the image data on the image memory based on a correction amount (Xint, Yint) expressed as:

$$Xint=int(X)$$

$$Yint=int(Y).$$

Here, when the correction amount (Xint, Yint) is positive, the image synthesizing circuit 6 corrects the image data A, and when the correction amount (Xint, Yint) is negative, the image synthesizing circuit 6 corrects the image data B.

To be more specific, the shift amount generating unit 7 outputs the second correction image shift amount (X', Y'), which is in effect a decimal fraction part of the first correction image shift amount (X, Y), to the control circuit 8 to shift the subject image. On the other hand, the image synthesizing circuit 6 corrects the image by an amount corresponding to an integer part of the first correction image shift amount (X, Y).

Figures 6A, 6B:
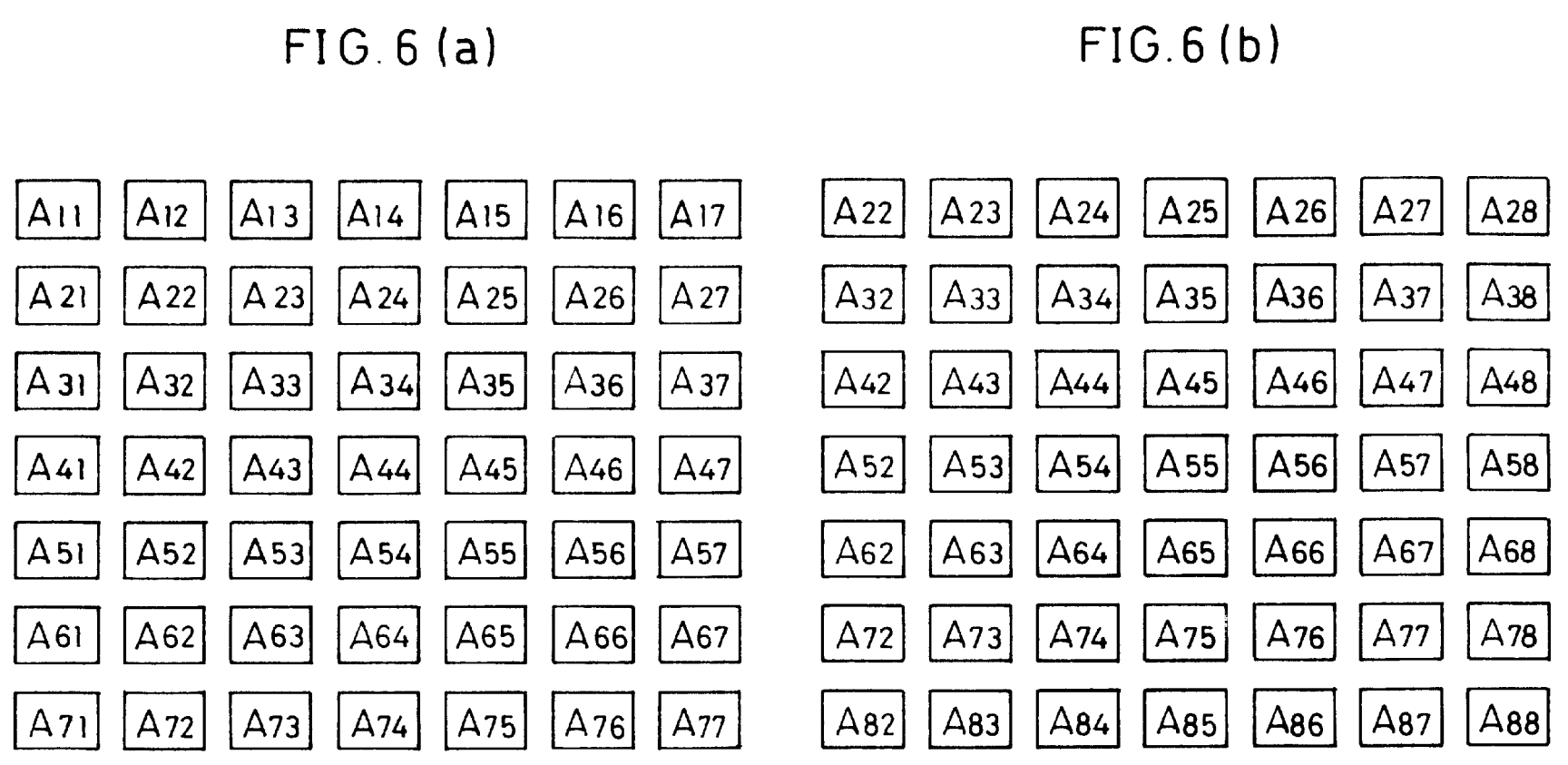

FIGS. 6(a) and 6(b) illustrate the alignment of the image data A on the image memory of the image synthesizing circuit 6 when Xint=1 and Yint=1. More specifically, FIG. 6(a) illustrates the alignment of the image data A before the correction, and FIG. 6(b) illustrates the alignment of the image data A after the correction. Note that the numerical subscripts indicate serial column and row numbers assigned to each piece of image data. For example, $A_{12}$ indicates that it is a piece of the image data A in the first column and second row.

After the image data are corrected in the above manner, the image data $A_{22}$ are shifted to where the image data $A_{11}$ were positioned before the correction. Likewise, the image data $A_{23}$ are shifted to where the image data $A_{12}$ were positioned before the correction. In other words, Xint and Yint are added to the numerical subscripts of the image data before the correction to update the numerical subscripts, and the corrected image data are re-aligned in accordance with the updated numerical subscripts.

Figure 7:
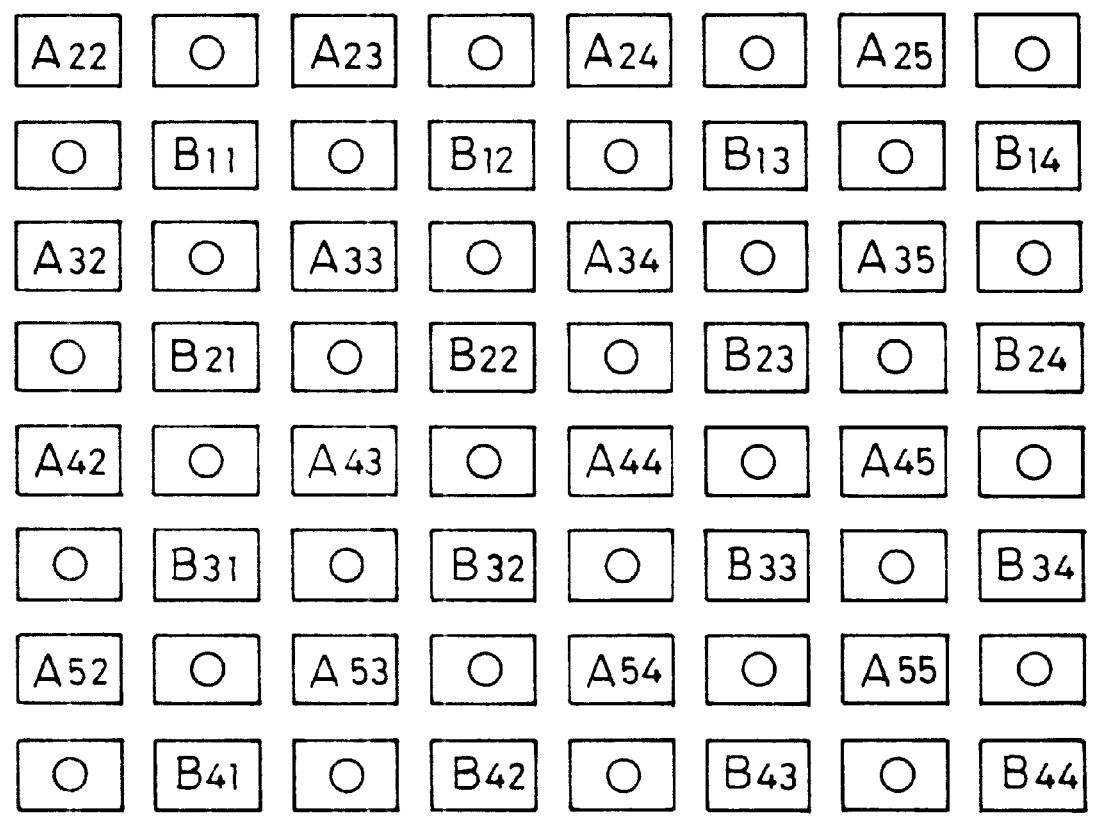

FIG. 7 illustrates the result of synthesizing the image data A and B thus corrected. As can be understood from the drawing, the image data $A_{11}$, $A_{12}$, etc. are missing in the synthesized image data. However, compared with all the pixels in the synthesized image data, the number of such missing pixels are quite small and negligible.

As has been explained, the shift amount generating unit 7 divides the first correction image shift amount (X, Y) into the second correction image shift amount (X', Y') and the correction amount (Xint, Yint) based on the predetermined equations. Herein, the second correction image shift amount (X', Y') is a decimal fraction part of the first correction image shift amount, that is, less than a pixel pitch, and based on which the X-axis image shifting mechanism 3 and Y-axis image shifting mechanism 4 shift the subject image.

Consequently, since a range of the image shifting is reduced, even if the X-axis image shifting mechanism 3 and Y-axis image shifting mechanism 4 are compact, the image shifting can be effected in a satisfactory manner at high speeds. Thus, not only can the X-axis image shifting mechanism 3 and Y-axis image shifting mechanism 4 can be downsized, but also the image shifting can be accelerated.

In case that Xint and Yint are negative, the image data B can be corrected in the above manner.

Embodiment 3

The following description will describe a further example embodiment of the present invention with reference to the accompanying drawings. Since an imaging apparatus of the present embodiment is identical with the counterpart in Embodiment 1 above in structure, the explanation of the same is omitted herein. Also, since the components other than the image synthesizing circuit 6 and shift amount generating unit 7 (see FIG. 1) operate in the same manner as their respective counterparts in Embodiment 1 above, only the operation of the image synthesizing circuit 6 and shift amount generating unit 7 will be described mainly in the following.

Figure 8:
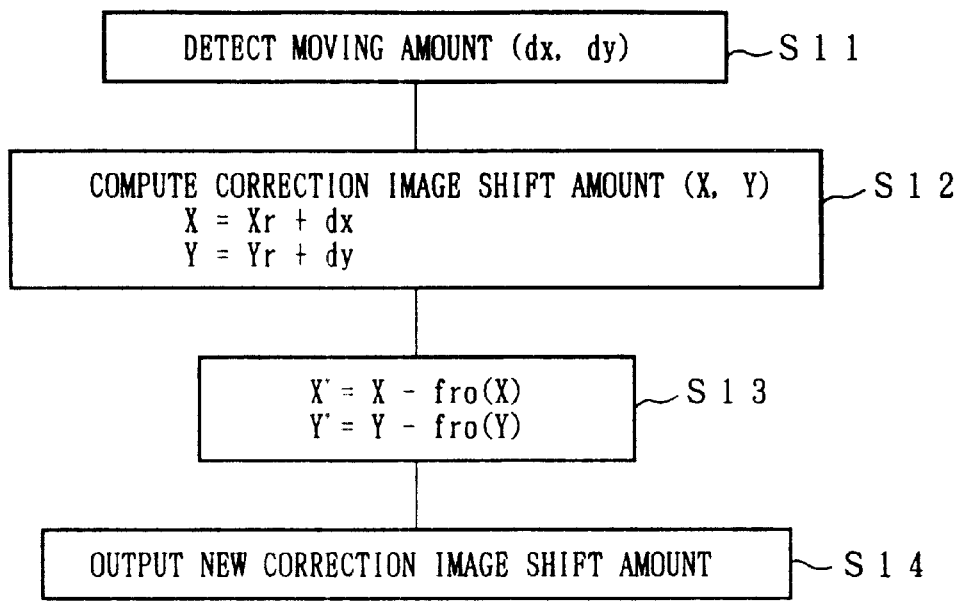
FIG. 8 is a flowchart detailing another operation of the shift amount generating unit.

FIG. 8 is a flowchart detailing an operation of the shift amount generating unit 7 of the present embodiment. It is helpful to also refer to FIG. 1 in the following explanation as was in Embodiment 2 above.

To begin with, when the moving amount detecting unit 9 detects the moving amount (dx, dy) (S11), the shift amount generating unit 7 computes the first correction image shift amount (X, Y) based on the equations used in Embodiment 1 above (S12).

Then, the shift amount generating unit 7 carries out a following operation to obtain a new correction image shift amount, namely, the second correction image shift amount (X', Y') (S13):

$$X'=X-cei(X)$$

$$Y'=Y-cei(Y).$$

where cei(a) is a least integer not smaller than a.

Then, the shift amount generating unit 7 outputs the second correction image shift amount (X', Y') to the control circuit 8 (S14).

On the other hand, the image synthesizing circuit 6 corrects the image data on the image memory based on a correction amount (Xcei, Ycei) expressed as:

$$Xcei=cei(X)$$
$$Ycei=cei(Y).$$

Here, when the correction amount (Xcei, Ycei) is positive, the image synthesizing circuit 6 corrects the image data A, and when the correction amount (Xcei, Ycei) is negative, the image synthesizing circuit 6 corrects the image data B.

To be more specific, the shift amount generating unit 7 outputs the second correction image shift amount (X', Y'), which is a balance between the first correction image shift amount (X, Y) and the first correction image shift amount (X, Y) with a rounded up decimal fraction part, to the control circuit 8. Here, the second correction image shift amount (X', Y') is a value smaller than a pixel pitch and the first correction image shift amount (X, Y), based on which the X-axis image shifting mechanism 3 and Y-axis image shifting mechanism 4 shift the subject image based.

On the other hand, the image synthesizing circuit 6 corrects the image data by an amount corresponding to the correction image shift amount (X, Y) with a rounded up decimal fraction part through the image processing in the same manner as Embodiment 2 above and the explanation of the same is omitted herein.

Thus, a range of the image shifting is also reduced in the imaging apparatus of the present embodiment, and therefore, the similar effects to those realized in Embodiment 2 above can be achieved herein.

Embodiment 4

The following description will describe still another example embodiment of the present invention with reference to the accompanying drawings. Since an imaging apparatus of the present embodiment is identical with the counterpart in Embodiment 1 above in structure, the explanation of the same is omitted herein. Also, since the components other than the image synthesizing circuit 6 and shift amount generating unit 7 (see FIG. 1) operate in the same manner as their respective counterparts in Embodiment 1 above, the operation of the image synthesizing circuit 6 and shift amount generating unit 7 will be described mainly in the following.

Figure 9:
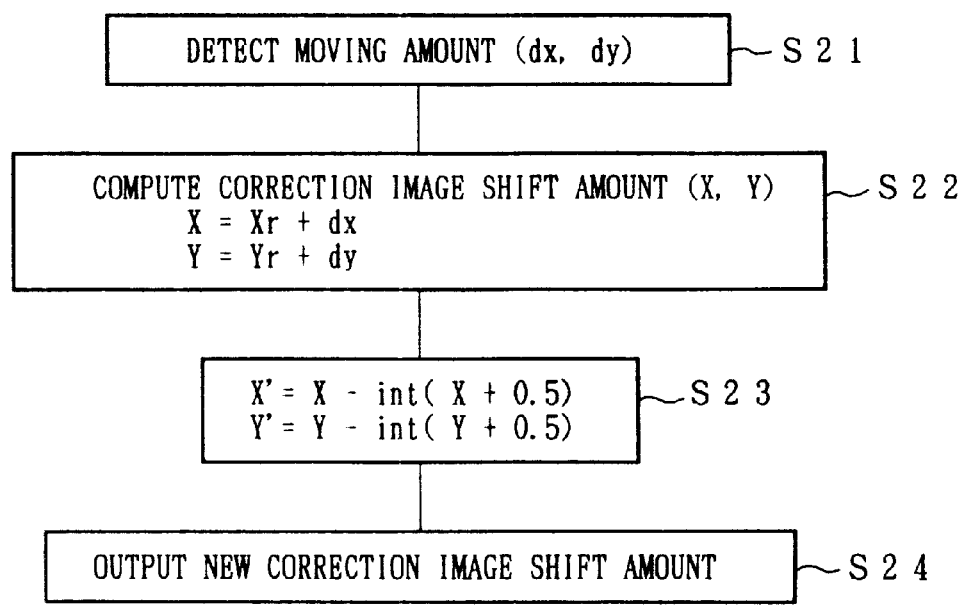
FIG. 9 is a flowchart detailing a further operation of the shift amount generating unit.

FIG. 9 is a flowchart detailing an operation of the shift amount generating unit 7 of the present embodiment. It is helpful to also refer to FIG. 1 in the following explanation as was in Embodiment 2 above.

To begin with, when the moving amount detecting unit 9 detects the moving amount (dx, dy) (S21), the shift amount generating unit 7 computes the first correction image shift amount (X, Y) based on the equations used in Embodiment 1 above (S22).

Then, the shift amount generating unit 7 carries out a following operation to obtain a new correction image shift amount, namely, the second correction image shift amount (X', Y') (S23):

$$X=X-int(X+0.5)$$
$$Y=Y-int(Y+0.5).$$

where int(a) is a greatest integer not larger than a.

Then, the shift amount generating unit 7 outputs the second correction image shift amount (X', Y') to the control circuit 8 (S24).

On the other hand, the image synthesizing circuit 6 corrects the image data on the image memory based on a correction amount (Xint, Yint) expressed as:

$$Xint=int(X+0.5)$$
$$Yint=int(Y+0.5).$$

Here, when the correction amount (Xint, Yint) is positive, the image synthesizing circuit 6 corrects the image data A, and when the correction amount (Xint, Yint) is negative, the image synthesizing circuit 6 corrects the image data B.

To be more specific, the shift amount generating unit 7 outputs the second correction image shift amount (X', Y'), which is a balance between the first correction image shift amount (X, Y) and an integer part of a sum of the first correction image shift amount (X, Y) and 0.5, to the control circuit 8. Here, the second correction image shift amount (X', Y') is a value smaller than a ±0.5 pixel pitch and the first correction image shift amount (x, Y), based on which the X-axis image shifting mechanism 3 and Y-axis image shifting mechanism 4 shift the subject image.

On the other hand, the image synthesizing circuit 6 corrects the image data by an amount corresponding to an integer part of a sum of the first correction image shift amount (X, Y) and 0.5 in the same manner as Embodiment 2 above, and the explanation of the same is omitted herein.

Thus, the imaging apparatus of the present embodiment can also attain the effects similar to those realized in Embodiment 2 above. Particularly in the present embodiment, an absolute shift value by the image shifting is reduced compared with Embodiments 1 through 3 above because a shift amount of the subject image is ±0.5 pixel pitch or less. Consequently, not only can the X-axis image shifting mechanism 3 and Y-axis image shifting mechanism 4 (see FIG. 1) be further downsized, but also the image shifting can be further accelerated.

Embodiment 5

The following description will describe still another example embodiment of the present invention with reference to the accompanying drawings. Hereinafter, like components are labeled with like reference numerals with respect to Embodiments 1 through 4 above, and the description of these components is not repeated for the explanation's convenience.

Figure 10:
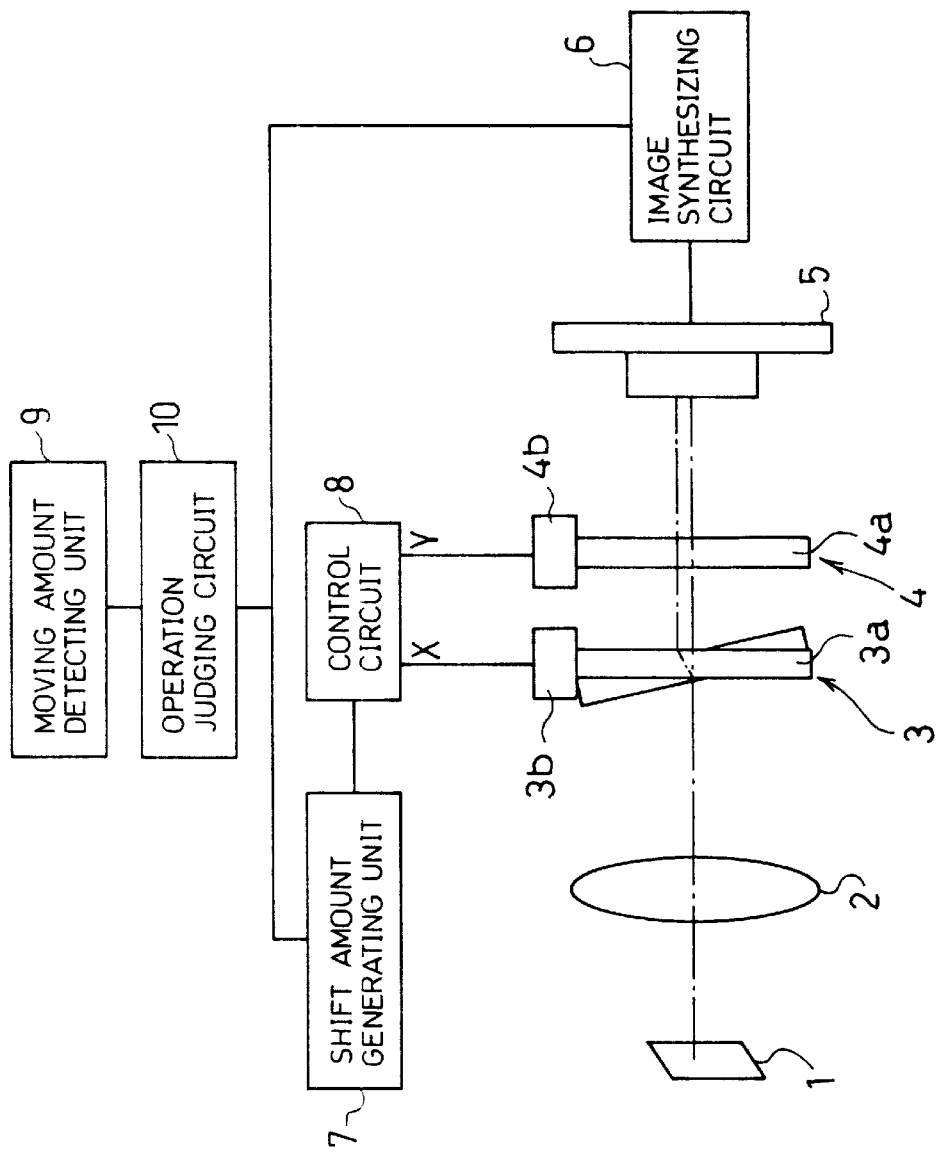
FIG. 10 is a view explaining another example embodiment of the above imaging apparatus.

As schematically shown in FIG. 10, an imaging apparatus of the present embodiment comprises an optical series 2, an X-axis image shifting mechanism 3 and a Y-axis image shifting mechanism 4 both serving as an image shifting mechanism, a solid-state imaging element 5, an image synthesizing circuit 6, a shift amount generating unit 7, a control circuit 8, a moving amount detecting unit 9, and an operation judging circuit 10. In the drawing, an alternate long and short dash line denotes the optical axis.

To make the explanation easy to understand, other components not particularly relevant to the present invention (for example, a driving circuit of the solid-state imaging element 5, an image processing unit for generating a video signal) are omitted in the drawing and the explanation of the same is also omitted herein. However, the omission is not intended to limit the scope of the present invention.

Also, in the present embodiment, the image synthesizing circuit 6 is connected to the shift amount generating unit 7, and the moving amount detecting unit 9 is connected to both the shift amount generating unit 7 and image synthesizing circuit 6 through the operation judging circuit 10. The operation judging circuit 10 is furnished with a function for controlling the operations of the shift amount generating unit 7 and image synthesizing circuit 6 based on a judgment of whether the image shifting should be effected or not made by comparing the moving amount detected by the moving amount detecting unit 9 with a predetermined value.

When the operation judging circuit 10 judges that the moving amount is greater than the predetermined value, the image synthesizing circuit 6 applies the interpolation to an image formed on the solid-state imaging element 5 to obtain a final image. On the other hand, when the operation judging circuit 10 judges that the moving amount is equal to or smaller than the predetermined value, the image synthesizing circuit 6 synthesizes a plurality of shifted images.

Figure 11:
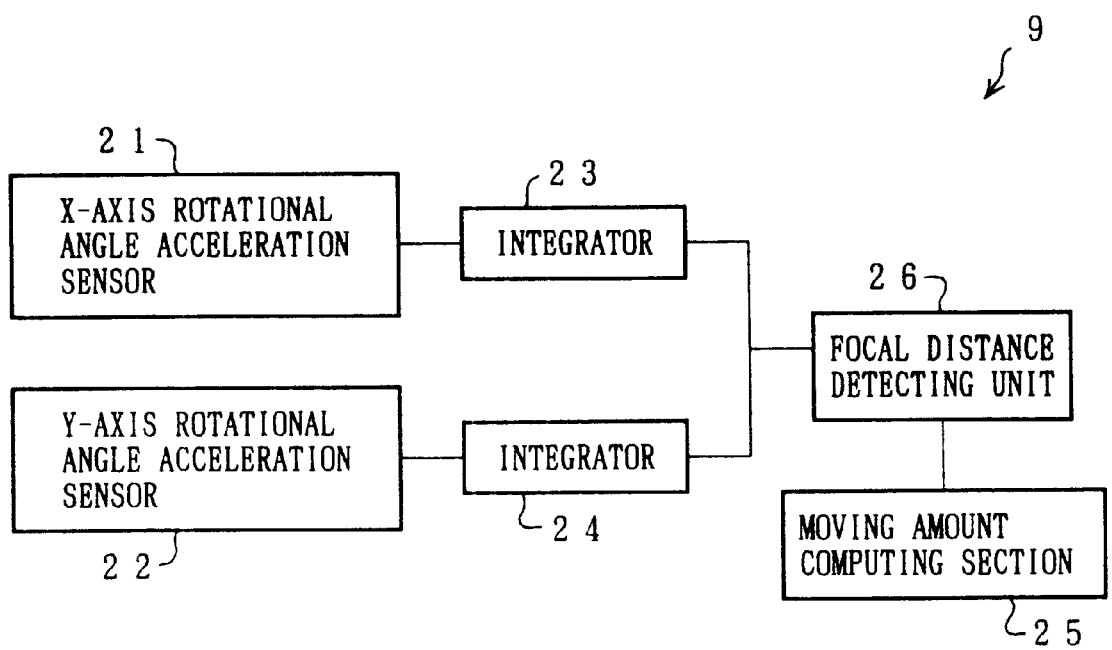
FIG. 11 is a block diagram depicting an example arrangement of a moving amount detecting unit.

In the following, the structure of the moving amount detecting unit 9 of the present embodiment will be explained with reference to FIG. 11.

As shown in the drawing, the moving amount detecting unit 9 includes a rotational angle acceleration sensor for detecting a rotational angle acceleration of the imaging apparatus. The rotational angle acceleration sensor referred herein comprises an X-axis rotational angle acceleration sensor 21 for detecting the rotational angle acceleration along the X-axis of the imaging apparatus, and a Y-axis rotational angle acceleration sensor 22 for detecting a rotational angle acceleration along the Y-axis of the imaging apparatus. The X-axis an Y-axis directions referred herein are the horizontal and vertical directions of the solid-state cameral element 5 with respect to the pixel array, respectively.

The X-axis rotational angle acceleration sensor 21 and Y-axis rotational angle acceleration sensor 22 are connected to integrators 23 and 24, respectively. The integrators 23 and 24 integrate the outputs respectively from the X-axis rotational angle acceleration sensor 21 and Y-axis rotational angle acceleration sensor 22 to find rotational angular velocities.

The moving amount detecting unit 9 further includes a focal length detecting unit 25. The focal length detecting unit 25 detects a focal length of the optical series 2 and outputs the same to a moving amount computing section 26 which will be described below. In case that the optical series 2 has a fixed focal point, the focal length detecting unit 25 does not detect a focal length, and instead, outputs a constant value, for example. The focal length detecting unit 25 may be a potentiometer associated with a variator or a compensator provided in the optical series 2. However, the focal length detecting unit 25 is not limited to the above examples, and any unit which can detect the focal length of the optical series 2 will do.

The focal length detecting unit 25 is connected to the above-mentioned moving amount computing section 26. The moving amount computing section 26 is furnished with a function for computing a moving amount of the subject image on the solid-state imaging element 5 in a time dt based on the information as to the rotational angular velocities outputted from the integrators 23 and 24 and the focal length outputted from the focal length detecting unit 25. The time dt referred herein is the time necessary to store the image data received by an unillustrated photoreceptor section on the solid-state imaging element 5 into the image memory of the image synthesizing circuit 6.

Here, assume that f is the detected focal length of the optical series 2, θx and θy are the rotational angular velocities in the X-axis direction and Y-axis direction, respectively, k is a shift of the subject image on the solid-state imaging element 5 generated at the unit rotational angular velocity of the imaging apparatus, then the moving amount (dx, dy) is computed based on the following equations:

$$dx = k \cdot f/f_0 \cdot \theta x \cdot dt$$

$$dy = k \cdot f/f_0 \cdot \theta y \cdot dt.$$

In the present embodiment, the X-axis rotational angle acceleration sensor 21 and Y-axis rotational angle acceleration sensor 22 are used to detect the moving amount of the imaging apparatus. However, an angular velocity sensor, such as Gyrostar of Murata Mfg. Co., Ltd., can be used. In this case, the integrators 23 and 24 are omitted naturally.

According to the above arrangement, the moving amount computing section 26 computes the moving amount based on the outputs (X-axis rotational angle acceleration and Y-axis rotational angle acceleration) from the X-axis rotational angle acceleration sensor 21 and Y-axis rotational angle acceleration sensor 22, the output (rotational angular velocity) from the angular velocity sensor, and the output (focal length) from the focal length detecting unit 25. Consequently, it has become possible to always detect the moving amount of the subject image on the solid-state imaging element 5 depending on the focal length of the optical series 2 in an adequate manner.

If the response rate of the angular velocity sensor is slow or the signal processing is delayed, the moving amount can not be detected in real time. Examples of such a case include when a response rate of the X-axis rotational angle acceleration sensor 21 and Y-axis rotational angle acceleration sensor 22 or the computing speed of the integrators 23 and 24 is slow.

However, the above problem can be eliminated by detecting the moving amount periodically and predicting the moving amount at a time dt later based on the moving amounts detect ed i n the past. For example, the moving amount can be predicted by the linear prediction in which a change of the moving amount over time is predicted based on the moving amounts in the past, or by predicting the change of the moving amount over time based on high-order functions. The above prediction is possible because the bandwidth of the moving amount of the imaging apparatus is quite low compared with a frequency having the reciprocal of the moving amount detecting cycle.

Thus, the imaging apparatus of the present embodiment can predict the moving amount at a specific time later using the moving amount computed based on the outputs (X-axis rotational angle acceleration and Y-axis rotational angle acceleration) from the X-axis rotational angle acceleration sensor 21 and Y-axis rotational angle acceleration sensor 22, the output (rotational angular velocity) from the angular velocity sensor, and the output (focal length) from the focal length detecting unit 25. Consequently, it has become possible to detect an optimal moving amount when computing the correction amount even if the response rates of the sensors are slow and the signal processing is delayed.

Figure 12:
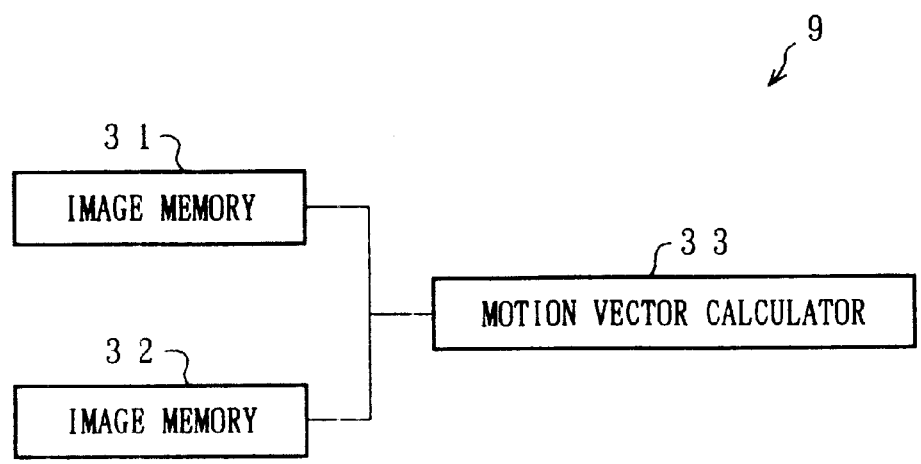
FIG. 12 is a block diagram depicting another example arrangement of the moving amount detecting unit.

Next, another example structure of the moving amount detecting unit 9 will be explained with reference to FIG. 12.

As shown in the drawing, the moving amount detecting unit 9 comprises an image memory 31 for storing the image data formed on the solid-state imaging element 5, an image memory 32 for storing the image data B obtained at a time dt later since the image data A are obtained, and a motion vector calculator 33 for calculating a motion vector between the image memories 31 and 32. In other words, the moving amount is found as a motion vector amount herein. The motion vector can be calculated by known methods, such as the gradient method, representative points matching method, and optical flow method, and the explanation of the same is omitted herein.

Note that the time difference between the formation of the two images used to calculate the motion vector is not limited to dt. A motion vector amount dx and dy in the time dt can be calculated based on a motion vector amount dx' and dy' at an arbitral time dt' based on the following equations:

$dx = dx' \cdot dt/dt'$ $dy = dy' \cdot dt/dt'$.

When the moving amount detecting unit 9 is arranged in the above manner, the moving amount of the subject image can be directly found as a shifting amount of the subject image on the solid-state imaging element 5. Thus, a sensor for detecting the focal length of the optical series 2, the rotational angular velocity, or the rotating speed of the imaging apparatus can be omitted. Therefore, according to the above arrangement, the cost of the imaging apparatus can be reduced. Further, since it is no longer necessary to correct the focal length or the like, an amount of the job can be reduced.

When the operation rate of the motion vector calculator 33 is slow, the motion vector amount, namely, moving amount, can not be detected in real time. However, this problem can be eliminated by detecting the moving amount periodically and predicting the moving amount at a time dt later based on the moving amounts detected in the past.

The moving amount can be predicted by the linear prediction in which a change of the moving amount over time is predicted based on the moving amounts in the past, or by predicting the change of the moving amount over time based on high-order functions. The above prediction is possible because the bandwidth of the moving amount of the imaging apparatus is quite low compared with a frequency having the reciprocal of the moving amount detecting cycle.

Thus, the imaging apparatus of the present embodiment can predict the motion vector amount outputted from the motion vector calculator 33, namely, the moving amount, at a specific time later. Consequently, an optimal moving amount can be detected to compute the correction amount even if the signal processing is delayed.

Figure 13:
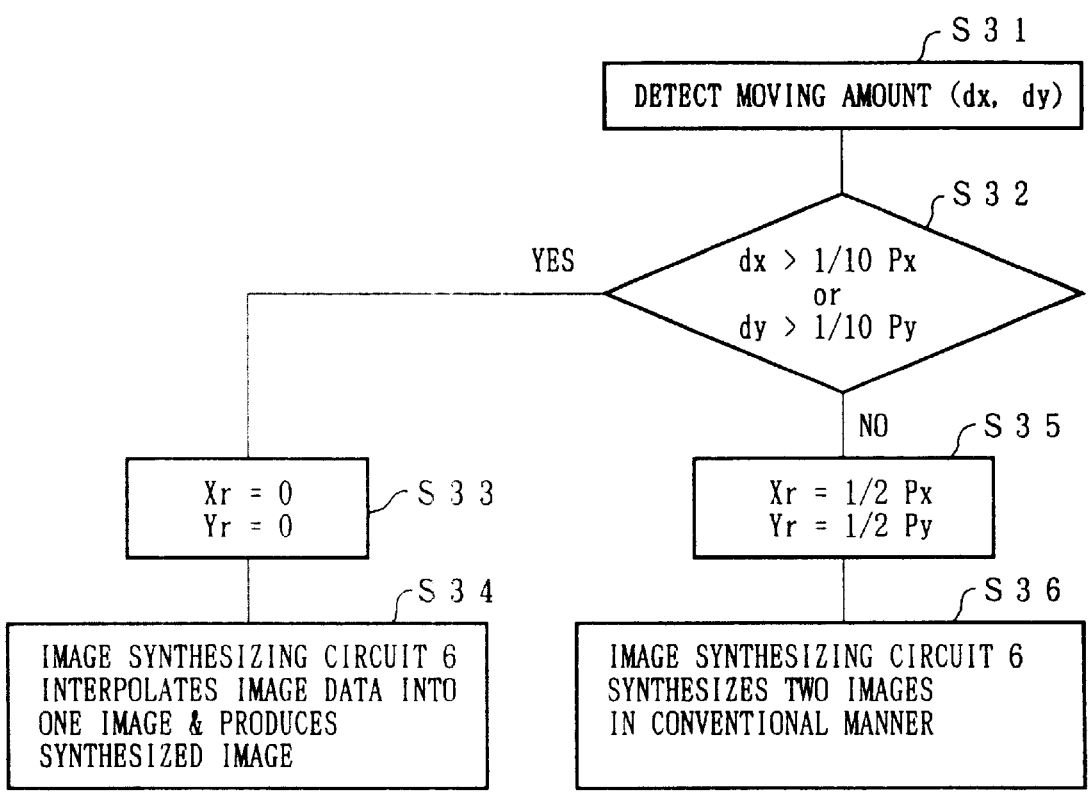
FIG. 13 is a flowchart detailing an operation of an operation judging circuit provided in the above imaging apparatus.

Next, an operation of the imaging apparatus of the present embodiment will be explained with reference to FIG. 13. Since the components other than the moving amount detecting unit 9 and operation judging circuit 10 operate in the same manner as their respective counterparts in Embodiment 1, the operations of the moving amount detecting unit 9 and operation judging circuit 10 will be explained mainly in the following.

To begin with, when the moving amount detecting unit 9 detects the moving amount (dx, dy) (S31), the operation judging circuit 10 judges whether the detected moving amount (dx, dy) is ⅕ or less of the image shift amount (Xr, Yr) outputted from the shift amount generating unit 7.

For example, given Xr=½Px, Yr=½Py, then the operation judging circuit 10 judges whether the detected moving amount is 1/10 or less of the pixel pitch Px and Py (S32).

When the operation judging circuit 10 judges that at least dx or dy of the moving amount (dx, dy) is larger than 1/10 of the pixel pitch Px or Py, the operation judging circuit 10 sets 0 to the image shift amount (Xr, Yr) generated by the shift amount generating unit 7 (that is, Xr=0, Yr=0), so that the control circuit 8 controls the X-axis image shifting mechanism 3 and Y-axis image shifting mechanism 4 not to effect the image shifting (S33). Here, the output value from the shift amount generating unit 7 is maintained at a fixed value (Xr=0, Yr=0).

Then, the image synthesizing circuit 6 applies the interpolation to the image data of one subject image to form a high-resolution synthesized image (S34), which is carried out by known methods, such as the cubic convolution and nearest neighbor method. Thus, further explanation of the same is omitted herein.

On the other hand, when the operation judging circuit 10 judges that at least dx or dy of the moving amount (dx, dy) is 1/10 or less of the pixel pitch Px or Py in S32, the operation judging circuit 10 sets the image shift amount generated by the shift amount generating unit 9 to Xr=½Px and Yr=½Py (S35), after which the control circuit 8 controls the image shifting mechanism to effect the image shifting in the conventional manner. Accordingly, a high-resolution image can be obtained by synthesizing two images by means of the image synthesizing circuit 6 in the conventional manner (S36).

The reason why the moving amount (dx, dy) is compared with ⅕ of the image shift amount (Xr, Yr) in S32 has the grounds in experimental results.

In other words, an experiment is carried out to check how the change of the image shift amount (Xr, Yr) influences an image obtained by the image shifting, and a comparison reference amount with respect to the moving amount (dx, dy) is selected based on the experimental results.

In the following, the experiment will be explained more specifically. To begin with, the image shift amount (Xr, Yr) generated by the shift amount generating unit 7 is varied from the initial image shift amount (Xr, Yr) to, for example, (0.9Xr, 0.9Yr), (0.8Xr, 0.8Yr), . . . . Then, the image shifting is effected by these image shift amounts in the conventional manner, and the shifted images are synthesized by the image synthesizing circuit 6. The resulting images are compared visually and objectively to check the influence of the change of the image shift amount.

Consequently, when the image shift amount (Xr, Yr) is varied by ±20%, the resulting image through the image shifting has a high resolution, meaning that the image shifting is effective. Thus, the comparison reference with respect to the moving amount (dx, dy) is set to ⅕ of the image shift amount (Xr, Yr).

Herein, ⅕ of the image shift amount (Xr, Yr) is selected based on the above experiment results, and this value is not necessarily applicable to all the image shifting techniques. In other words, the value varies with the image shifting techniques, types of the solid-state imaging element or the like. Therefore, it is highly recommended to conduct a similar experiment for each type of imaging apparatus and find an optimal value separately.

As has been explained, if the imaging apparatus of the present embodiment is shaken by hand holding or the like, the image synthesizing circuit 6 operates in the best manner depending on the moving amount. Consequently, the imaging apparatus of the present embodiment can opt an optimal image processing method depending on the moving amount, thereby obtaining a high-resolution image without being affected by the moving amount.

Herein, the starting and ending actions of the image shifting is controlled based on the moving amount detected by the moving amount detecting unit 9. However, the image synthesizing circuit 6 may operate while effecting the image shifting.

Embodiment 6

The following description will describe still another example embodiment of the present invention with reference to the accompanying drawings. An imaging apparatus of the present embodiment is identical with its counterpart in Embodiment 5 above except that an optical series 2' is used instead of the optical series 2 (see FIG. 10) and the moving amount detecting unit 9 (see FIG. 10) comprises the focal length detecting unit 25 alone. Hereinafter, like components are labeled with like reference numerals with respect to Embodiment 5, and the description of these components is not repeated for the explanation's convenience.

Figure 14:
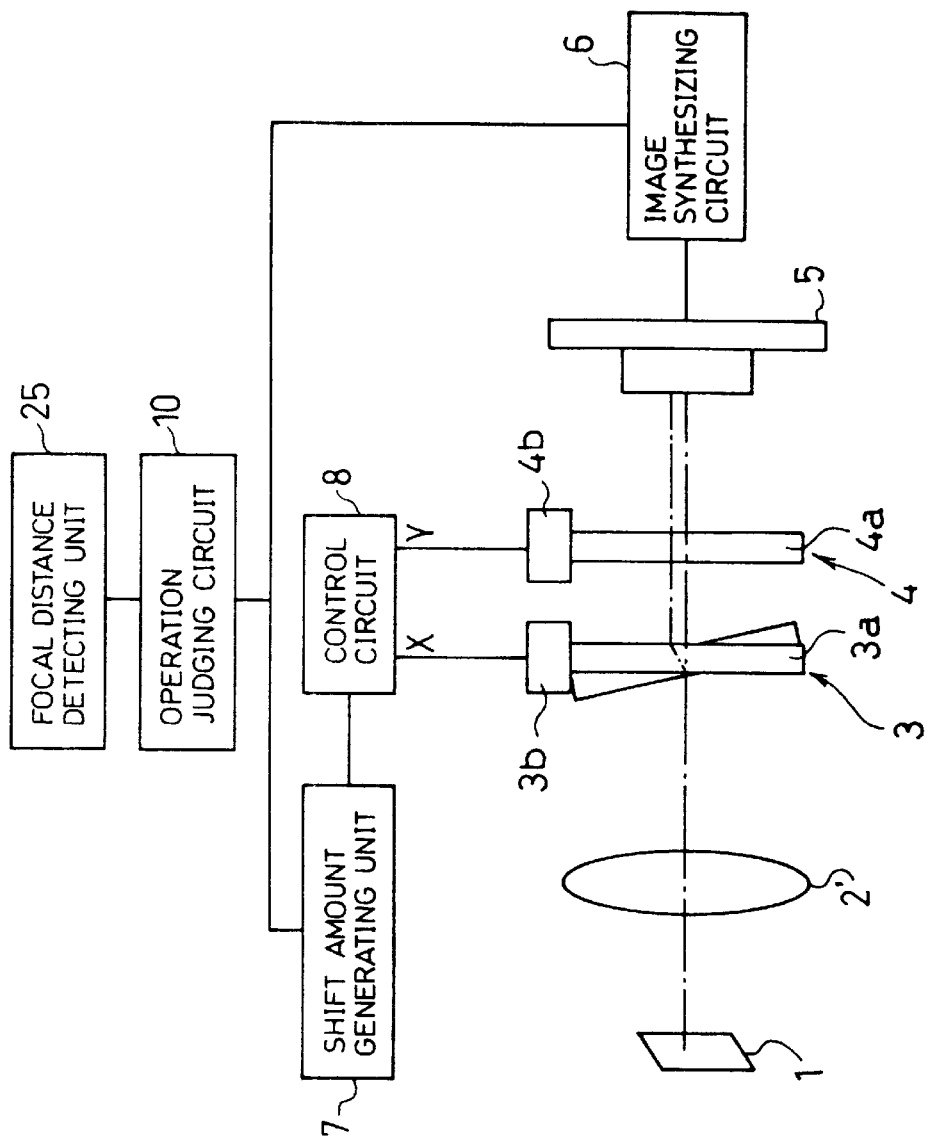
FIG. 14 is a view explaining a further example embodiment of the above imaging apparatus.

As schematically shown in FIG. 14, an imaging apparatus of the present invention comprises an optical series 2', an X-axis image shifting mechanism 3 and a Y-axis image shifting mechanism 4 both serving as an image shifting mechanism, a solid-state imaging element 5, an image synthesizing circuit 6, a shift amount generating unit 7, a control circuit 8, a focal length detecting unit 25, and an operation judging circuit 10. In the drawing, an alternate long and short dash line denotes the optical axis.

To make the explanation easy to understand, other components irrevalant to the present invention (for example, a driving circuit of the solid-state imaging element 5 and an image processing unit for generating a video signal) are omitted in the drawing and the explanation of the same is also omitted herein. However, the omission is not intended to limit the scope of the present invention.

The optical series 2' includes a series of lenses to focus incident light from the subject 1 on the solid-state imaging element 5. The optical series 2' is of the zoom type, namely, varifocal, that is, the focal length can be adjusted.

The focal length detecting unit 25 detects the focal length of the optical series 2'. The focal length detecting unit 25 may be a potentiometer associated with a variator or a compensator provided in the optical series 2'. However, the focal length detecting unit 25 is not limited to the above examples, and any unit which can detect the focal length of the optical series 2' will do.

The operation judging circuit 10 is furnished with a function to control the shift amount generating unit 7 and image synthesizing circuit 6 based on the focal length detected by the focal length detecting unit 25.

Herein, when the operation judging circuit 10 judges that the focal length thus detected is larger than a predetermined value, the image synthesizing circuit 6 applies the interpolation to an image formed on the solid-state imaging element 5 to obtain a final image. On the other hand, when the operation judging circuit 10 judges that the focal length thus detected is equal to or smaller than the predetermined value, the image synthesizing unit 6 synthesizes a plurality of shifted images.

Figure 15:
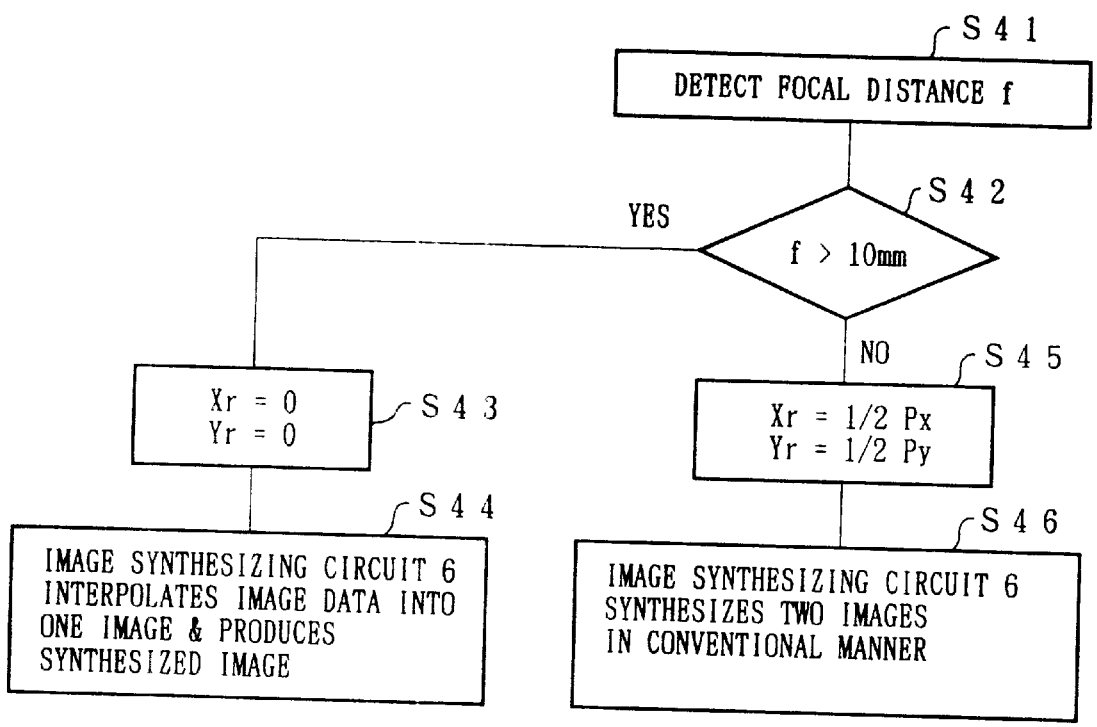
FIG. 15 is a flowchart detailing an operation of an operation judging circuit provided in the above imaging apparatus.
Figure 16:
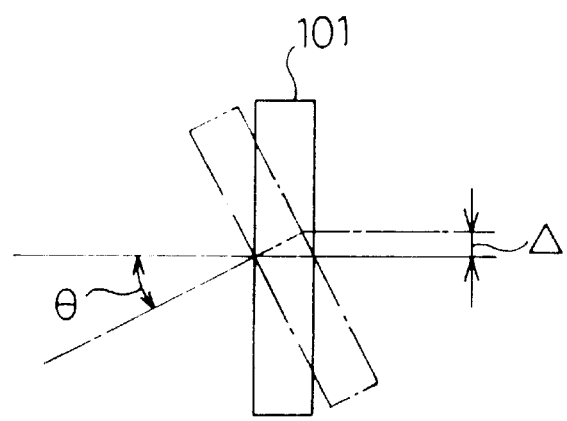
FIG. 16 is a cross section representing the principle of the image shifting.
Figure 17:
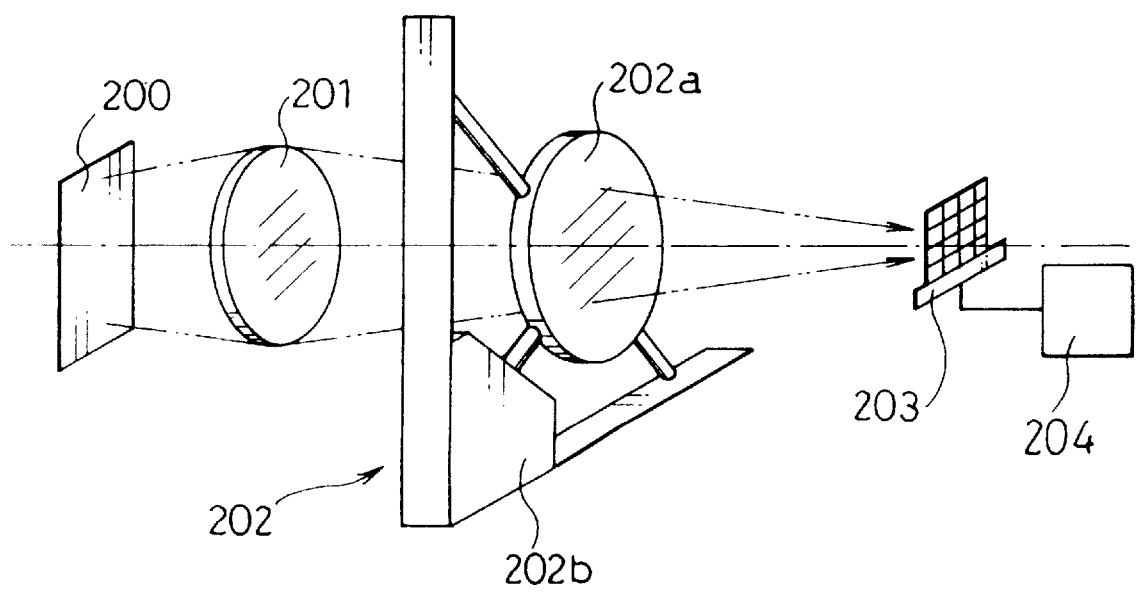
FIG. 17 is a perspective view showing an example embodiment of a conventional imaging apparatus.
Figure 19:
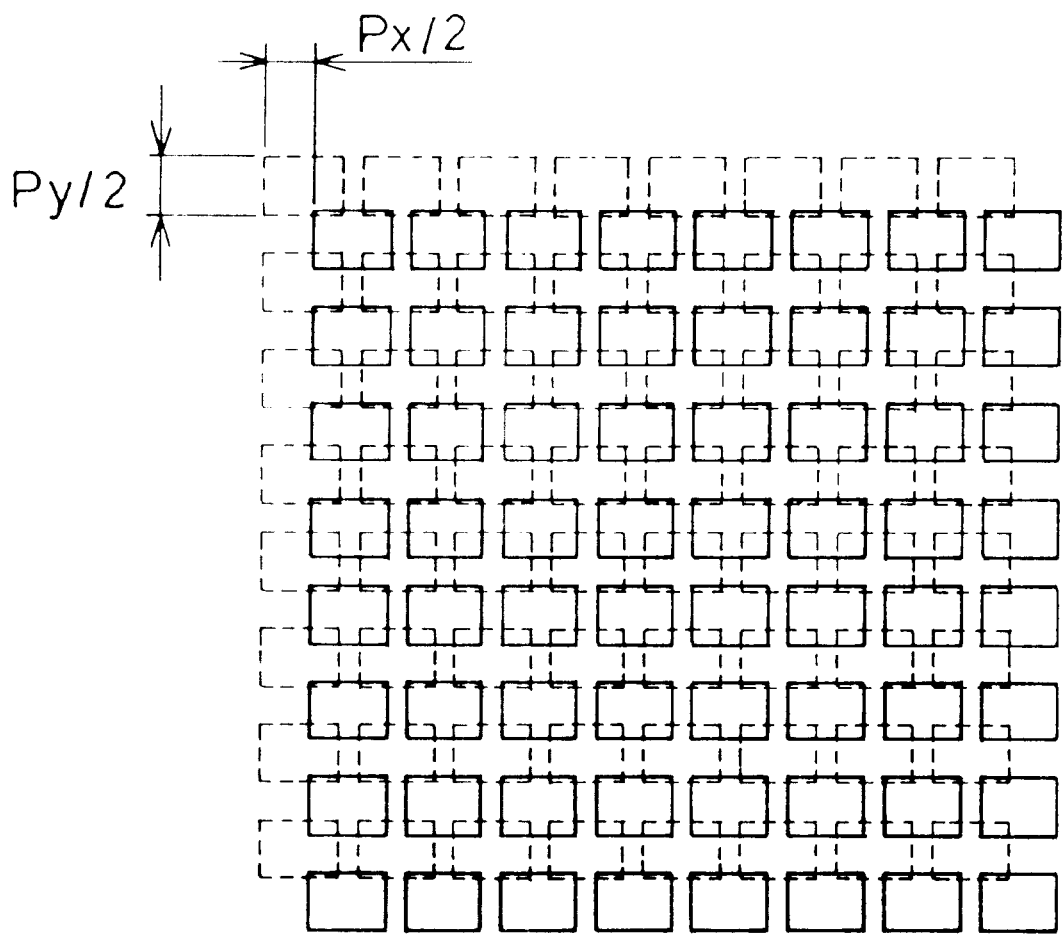
FIG. 19 is a view explaining an image shift amount between two kinds of image data.

Next, an operation of the imaging apparatus of the present embodiment will be explained with reference to FIG. 15. Here, the components other than the operation judging circuit 10 operate in the same manner as their respective counterparts in Embodiment 5, and the explanation of these components is omitted and mainly the operation of the operation judging circuit 10 will be explained in the following.

To begin with, when the focal length detecting unit 25 detects a focal length f of the optical series 2' (S41), the operation judging circuit 10 judges whether the focal length f is equal to 10 mm or smaller (S42).

When the operation judging circuit 10 judges that the focal length f is greater than 10 mm, the operation judging circuit 10 sets 0 to the image shift amount (Xr, Yr) generated from the shift amount generating unit 7 (that is, Xr=0, Yr=0) to inhibit the image shifting (S43). Here, the output value of the shift amount generating unit 7 is maintained at a fixed value (Xr=0, Yr=0).

Then, the image synthesizing circuit 6 applies the interpolation to the image data of one subject image to form high-resolution synthesized image (S44), which is carried out by known methods, such as the cubic convolution and nearest neighbor method. The explanation of the same is omitted for the sake of brevity.

On the other hand, when the operation judging unit 10 judges that the focal length f is equal to or smaller than 10 mm, the operation judging unit 10 sets the image shift amount generated by the shift amount generating unit 7 to Xr=½Px, Yr=½Py (S45), after which the image shifting is effected under the control of the control circuit 8 in the conventional manner. Consequently, the image synthesizing circuit 6 synthesizes two images in the conventional manner, and a high-resolution image can be obtained (S46).

The reason why the comparison reference with respect to the focal length f is set to 10mm has the grounds in the experimental results.

To begin with, the above-arranged imaging apparatus is supported by hands in a normal manner, and a high-resolution image of the subject 1 is obtained through the conventional image shifting. Then, the same operation is repeated for each focal length of the optical series 2'. Then, the resulting synthesized image is compared with a synthesized image obtained when the imaging apparatus is supported firmly on the tripod.

As a result, when the focal length of the optical series 2' is 10 mm or smaller, the resulting synthesized image has a resolution as high as the one realized when the imaging apparatus is supported fixedly. This is the reason why the comparison reference with respect to the focal length in the image shifting is set to 10 mm herein.

Note that the comparison reference with respect to the focal length is set to 10 mm based on the above experimental results, and this value is not necessarily applicable to all the image shifting techniques. In other words, the value varies with the image shifting techniques, types of the solid-state imaging element or the like. Therefore, it is highly recommended to conduct a similar experiment for each type of imaging apparatus and find an optimal value separately.

As has been explained, even if the imaging apparatus of the present embodiment is shaken by the hand holding or the like, the image synthesizing circuit 6 operates in the best manner depending on the focal length. Consequently, according to the above arrangement, an optimal image processing method is opted for the detected focal length, thereby making it possible to obtain a high-resolution image without being affected by the focal length.

As has been explained, an imaging apparatus of the present invention for forming a subject image which is incident on the solid-state imaging element 5 having thereon a matrix of pixels through the optical series 2 is furnished with:

an image shifting mechanism for shifting the subject image in 2-D relatively with respect to the solid-state imaging element 5;

a shift amount generating unit 7 for generating an image shift amount of the subject image;

a control circuit 8 for controlling the operation of the image shifting mechanism;

an image synthesizing circuit 6 for synthesizing a plurality of images shifted by the image shifting mechanism; and a moving amount detecting unit 9 for detecting a moving amount of the subject image on the solid-state imaging element 5, and arranged in such a manner that the shift amount generating unit 7 also generates a first correction image shift amount based on the image shift amount and moving amount, based on which the image shifting mechanism shifts the subject image.

Consequently, even if the subject image is moved when the imaging apparatus is supported by hands, for example, the image shifting is effected by taking such a moving amount into consideration. Thus, according to the above arrangement, if the imaging apparatus is moved while being supported by hands, the imaging apparatus can form a high-resolution image without being affected by such an unwanted movement.

In the above-arranged imaging apparatus, it is preferable that the image shifting mechanism includes an X-axis image shifting mechanism 3 solely responsible for the image shifting in the horizontal direction of the solid-state imaging element 5, and a Y-axis image shifting mechanism 4 solely responsible for the image shifting in the vertical direction of the solid-state imaging element 5.

It is more preferable that the X-axis image shifting mechanism 3 and Y-axis image shifting mechanism 4 include transparent plane parallel plates 3a and 4a, respectively, and driving unit 3b and 4b for tilting their respective transparent plane parallel plates 3a and 4b at a certain degree angle with respect to the optical axis of the optical series 2 in the horizontal and vertical directions, respectively.

According to the above arrangement, the image shifting can be effected more accurately in a reliable manner.

Also, it is preferable that the solid-state imaging element 5 comprises a matrix of charge coupled devices (CCDs) to improve the quality of the subject image.

It is preferable that the above imaging apparatus is arranged in such a manner that: the shift amount generating unit 7 divides the first correction image shift amount into a second image shift amount and a correction amount, so that the X-axis image shifting mechanism 3 and Y-axis image shifting mechanism 4 shift the subject image based on the second correction image shift amount, while the image synthesizing circuit 6 processes the image based on the correction amount.

According to the above arrangement, the first correction image shift amount is divided into the second image shift amount and correction amount by the shift amount generating unit 7 based on a certain equation. Then, the X-axis image shifting mechanism 3 and Y-axis image shifting mechanism 4 shift the subject image based on the second correction image shift amount which is smaller than the first correction image shift amount. Consequently, not only a compact image shifting mechanism can serve as the X-axis image shifting mechanism 3 and Y-axis image shifting mechanism 4 in a satisfactory manner, but also the image shifting can be accelerated. Thus, it has become possible to downsize the image shifting mechanism while speeding up the image shifting.

In the above-arranged imaging apparatus, it is preferable that the second correction image shift amount is a decimal fraction part of the first correction image shift amount, while the correction amount is an integer part of the first correction image shift amount.

According to the above arrangement, the X-axis image shifting mechanism 3 and Y-axis image shifting mechanism 4 shift the subject image based on the second correction image shift amount which is a decimal fraction part of the first image shift amount. This can reduce a range of the image shifting. More specifically, since the range of the image shifting is reduced to one pixel pitch or less, not only a compact image shifting mechanism can be adopted, but also the image shifting can be accelerated. Consequently, it has become possible to downsize the X-axis image shifting mechanism 3 and Y-axis image shifting mechanism 4 while speeding up the image shifting.

In the above-arranged imaging apparatus, the second correction image shift amount may be a balance between the first correction image shift amount and the first correction image shift amount with a rounded up decimal fraction part, and the correction amount may be the first correction image shift amount with a rounded up decimal fraction part.

According to the above arrangement, the X-axis image shifting mechanism 3 and Y-axis image shifting mechanism 4 shift the subject image based on the second correction image shift amount which is a balance between the first correction image shift amount and the first correction image shift amount with a rounded up decimal fraction part. This can reduce a range of the image shifting to one pixel pitch or less. Consequently, not only a compact image shifting mechanism can be adopted in a satisfactory manner, but also the image shifting can be accelerated. Thus, it has become possible to downsize the X-axis image shifting mechanism 3 and Y-axis image shifting mechanism 4 while speeding up the image shifting.

In the above-arranged imaging apparatus, the second correction image shift amount may be a balance between the first correction image shift amount and an integer part of a sum of the first correction image shift amount and 0.5, and the correction amount may be an integer part of a sum of the first correction image shift amount and 0.5.

According to the above arrangement, the X-axis image shifting mechanism 3 and Y-axis image shifting mechanism 4 shift the subject image based on the second correction image shift amount which is a balance between the first correction image shift amount and an integer part of a sum of the first correction image shift amount and 0.5. This can reduce a range of the image shifting. Consequently, not only a compact image shifting mechanism can be adopted in a satisfactory manner, but also the image shifting can be accelerated.

Also, according to the above arrangement, an image shift amount by the X-axis image shifting mechanism 3 and Y-axis image shifting mechanism 4, namely, the second correction image shift amount, is reduced to ±0.5 pixel pitch. This reduces an absolute amount of the shift by the image shifting. Thus, according to the above arrangement, not only can the image shifting mechanism be further downsized, but also the image shifting can be further accelerated.

Another imaging apparatus of the present invention is identical with the above imaging apparatus except that the shift amount generating unit 7 is replaced with an operation judging circuit 10 for judging whether the image shifting should be effected or not based on the comparison of the moving amount with a predetermined value. Accordingly, this imaging apparatus is arranged in such a manner that, when the operation judging circuit 10 judges that moving amount is greater than the predetermined value, the image synthesizing circuit 6 applies the interpolation to an image formed on the solid-state imaging element 5. When the operation judging circuit judges otherwise, the image synthesizing circuit 6 synthesizes a plurality of images shifted by the X-axis image shifting mechanism 3 and Y-axis image shifting mechanism 4.

According to the above arrangement, the image synthesizing circuit 6 can processes the image in the best manner depending on the detected moving amount, thereby making it possible to opt an optimal image processing method for the detected moving amount. Thus, it has become possible to obtain a high-resolution image without being affected by the moving amount.

It is preferable that the above imaging apparatus is arranged in such a manner that the moving amount detecting unit 9 includes:

an angular velocity sensor for detecting a rotational angular velocity of the imaging apparatus;

a focal length detecting unit 25; and a moving amount computing section 26 for computing a moving amount of the subject image at a specific time based on the information as to the rotational angular velocity outputted from the angular velocity sensor and the focal length outputted from the focal length detecting unit 25.

The angular velocity sensor may comprise an X-axis rotational angle acceleration sensor 21 for detecting a rotational angle acceleration in the horizontal direction of the imaging apparatus, a Y-axis rotational angle acceleration sensor 22 for detecting a rotational angle acceleration in the vertical direction of the imaging apparatus, and integrators 23 and 24 for computing rotational angular velocities by integrating the outputs from the rotational angle acceleration sensors 22 and 23, respectively.

According to the above arrangement, the moving amount detecting unit 9 detects the moving amount of the subject image on the solid-state imaging element 5 appropriately depending on the focal length of the optical series 2. This is because the moving amount computing section 26 computes the moving amount based on the output (angular velocity) from the angular velocity sensor, outputs (X-axis rotational angle acceleration and Y-axis rotational angle acceleration) from the X-axis rotational angle acceleration sensor 21 and Y-axis rotational angle acceleration sensor 22, and output (focal length) from the focal length detecting unit 25.

A further imaging apparatus of the present invention for forming a subject image which is incident on a solid-state imaging element 5 having thereon a matrix of pixels through a varifocal optical series 2' is furnished with:

an X-axis image shifting mechanism 3 and a Y-axis image shifting mechanism 4 for shifting the subject image in 2-D by a certain shift amount relatively with respect to the solid-state imaging element 5;

a control circuit 8 for controlling the operations of the X-axis image shifting mechanism 3 and Y-axis image shifting mechanism 4;

a focal length detecting unit 25 for detecting a focal length of the optical series 2';

an operation judging circuit 10 for judging whether the image shifting should be effected or not based on the comparison of the focal length with a predetermined value; and an image synthesizing circuit 6 for, when the operation judging circuit 10 judges that the focal length is greater than the predetermined value and the image shifting should not be effected, applying interpolation to an image formed on the solid-state imaging element 5, and when the judging circuit 10 judges that the focal length is equal to or smaller than the predetermined value and the image shifting should be effected, the image synthesizing circuit 6 synthesizing a plurality of images shifted by the X-axis image shifting mechanism 3 and Y-axis image shifting mechanism 4 through image processing.

According to the above arrangement, the image synthesizing circuit 6 can process the image in the best manner depending on the focal length, thereby making it possible to opt an optimal image processing method for the detected focal length. Consequently, a high-resolution image can be obtained without being affected by the focal length.

The imaging apparatus of the present invention uses the solid-state imaging element 5 as a camera tube; however, the camera tube is not limited to the solid-state imaging element 5. Also, although the imaging apparatus of the present invention is characterized by correcting a relative movement of the subject image when the subject image is formed, a correction image shift amount necessary for the correction only has to be based on the moving amount of the subject image on the camera tube detected by the moving amount detecting unit 9. When the relative movement of the image should be corrected more accurately in a reliable manner, it is preferable that the imaging apparatus includes all the aforementioned components.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An imaging apparatus comprising:
 a solid-state imaging element having thereon a matrix of pixels;
 an optical element for transferring a subject image to said solid-state imaging element;
 an image shifting mechanism for relatively shifting said subject image in two dimensions, with respect to said imaging apparatus,
  wherein said image shifting mechanism includes an X-axis image shifting mechanism for image shifting in a horizontal direction of said solid-state element, and a Y-axis image shifting mechanism for image shifting in a vertical direction of said solid-state element, and
  wherein each of said X-axis image shifting mechanism and Y-axis image shifting mechanism includes a transparent plane parallel plate, and a driving unit for tilting said transparent plane parallel plate at an angle with respect to an optical axis of said optical element in one of horizontal and vertical directions, respectively;
 a control circuit for controlling said image shifting mechanism;
 an image synthesizing circuit for synthesizing a plurality of images shifted by said image shifting mechanism;
 a moving amount detecting unit for detecting, as a moving amount, a relative movement of said subject image on said solid-state imaging element caused by vibration of said imaging apparatus; and
 a shift amount generating unit for generating an image shift amount of said subject image, and thereafter generating a first correction image shift amount based on said image shift amount and moving amount, wherein said image shifting mechanism shifts said subject image based upon said first correction image shift amount,
 wherein said shift amount generating unit divides said first correction image shift amount into a second correction image shift amount and a correction amount based on a predetermined equation, so that said X-axis image shifting mechanism and Y-axis image shifting mechanism shift said subject image based on said second correction image shift amount, said image synthesizing circuit processing an image based on said correction amount.

2. The imaging apparatus of claim 1, wherein said second correction image shift amount is a decimal portion of said first correction image shift amount, and said correction amount is an integer portion of said first correction image shift amount.

3. The imaging apparatus of claim 1, wherein said second correction image shift amount is a balance between said first correction image shift amount and said first correction image shift amount with a rounded up decimal fraction part, and said correction amount is said first correction image shift amount with a rounded decimal fraction part.

4. The imaging apparatus of claim 1, wherein said second correction image shift amount is a balance between said first correction image shift amount and an integer portion of a sum of said first correction image shift amount and 0.5, and said correction amount is an integer portion of a sum of said first correction image shift amount and 0.5.

* * * * *